United States Patent
Data et al.

(10) Patent No.: US 7,590,579 B2
(45) Date of Patent: Sep. 15, 2009

(54) FINANCIAL ADVISOR MESSAGING IN A NETWORKED COMPUTER SYSTEM

(75) Inventors: Justin Data, Ossining, NY (US); Michael Rizzo, Monroe Township, NJ (US); Rohit Kataria, Union City, NJ (US); Phil Hsu, Ho Ho Kus, NJ (US); J. Chris Marsh, Zürich (CH); Grace Davitt, Basking Ridge, NJ (US); Syed Wajahat Ali, Linden, NJ (US); Mark Distaulo, Hoboken, NJ (US); Jangliw Passavant, West Orange, NJ (US)

(73) Assignee: UBS Financial Services, Inc., Weehawken, NJ (US)

(*) Notice: Subject to any disclaimer, the term of this patent is extended or adjusted under 35 U.S.C. 154(b) by 1149 days.

(21) Appl. No.: 10/365,323

(22) Filed: Feb. 11, 2003

(65) Prior Publication Data

US 2004/0158516 A1    Aug. 12, 2004

(51) Int. Cl.
G06Q 40/00    (2006.01)
(52) U.S. Cl. .................................................. 705/36 R
(58) Field of Classification Search ............. 705/30–40, 705/14; 710/37; 713/171; 380/231
See application file for complete search history.

(56) References Cited

U.S. PATENT DOCUMENTS 6,039,245 A * 3/2000 Symonds et al. ............ 235/379

| | | | |
|---|---|---|---|
| 6,223,983 B1 | 5/2001 | Kjonaas et al. | |
| 6,324,525 B1 * | 11/2001 | Kramer et al. | 705/40 |
| 6,349,290 B1 | 2/2002 | Horowitz et al. | |
| 6,385,595 B1 | 5/2002 | Kolling et al. | |
| 2002/0055835 A1 | 5/2002 | Olivares et al. | |
| 2002/0065752 A1 * | 5/2002 | Lewis | 705/35 |
| 2002/0077940 A1 | 6/2002 | Riley et al. | |
| 2003/0033212 A1 * | 2/2003 | Sandhu et al. | 705/26 |

FOREIGN PATENT DOCUMENTS

| WO | WO01/50317 | 7/2001 |
|---|---|---|
| WO | WO01/61535 | 8/2001 |
| WO | WO01/61589 | 8/2001 |
| WO | WO01/61590 | 8/2001 |

OTHER PUBLICATIONS

Wireless News-Apr. 15, 2008-Akamai Powers Up with Certified Partnerships (c) 2008 10Meters—http://www.10meters.com.*

* cited by examiner

*Primary Examiner*—Mary Cheung
*Assistant Examiner*—Tien C Nguyen
(74) *Attorney, Agent, or Firm*—Proskauer Rose LLP

(57) ABSTRACT

The present invention provides systems and methods for financial advisor messages in a networked computer system. A financial advisor associated with a financial services organization determines clients to receive a message, the financial advisor determines the message, and the message is transmitted over the network to be accessible by the clients. Methods are provided in which the message is required to be determined to be compliant prior to transmission to the clients. Methods are also provided in which individuals associated with the financial services organization, such as the financial advisor, are notified of a non-compliant message.

24 Claims, 22 Drawing Sheets

Fig. 3                    300
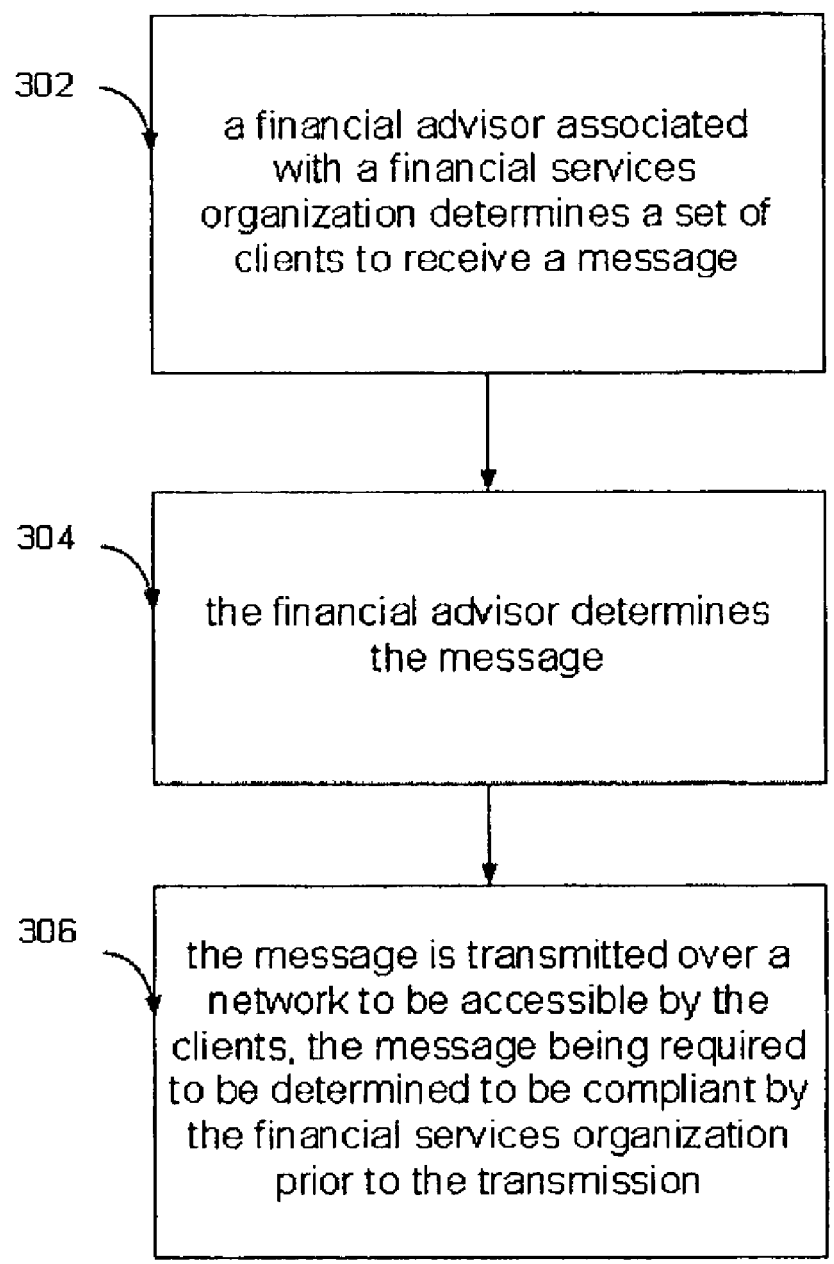

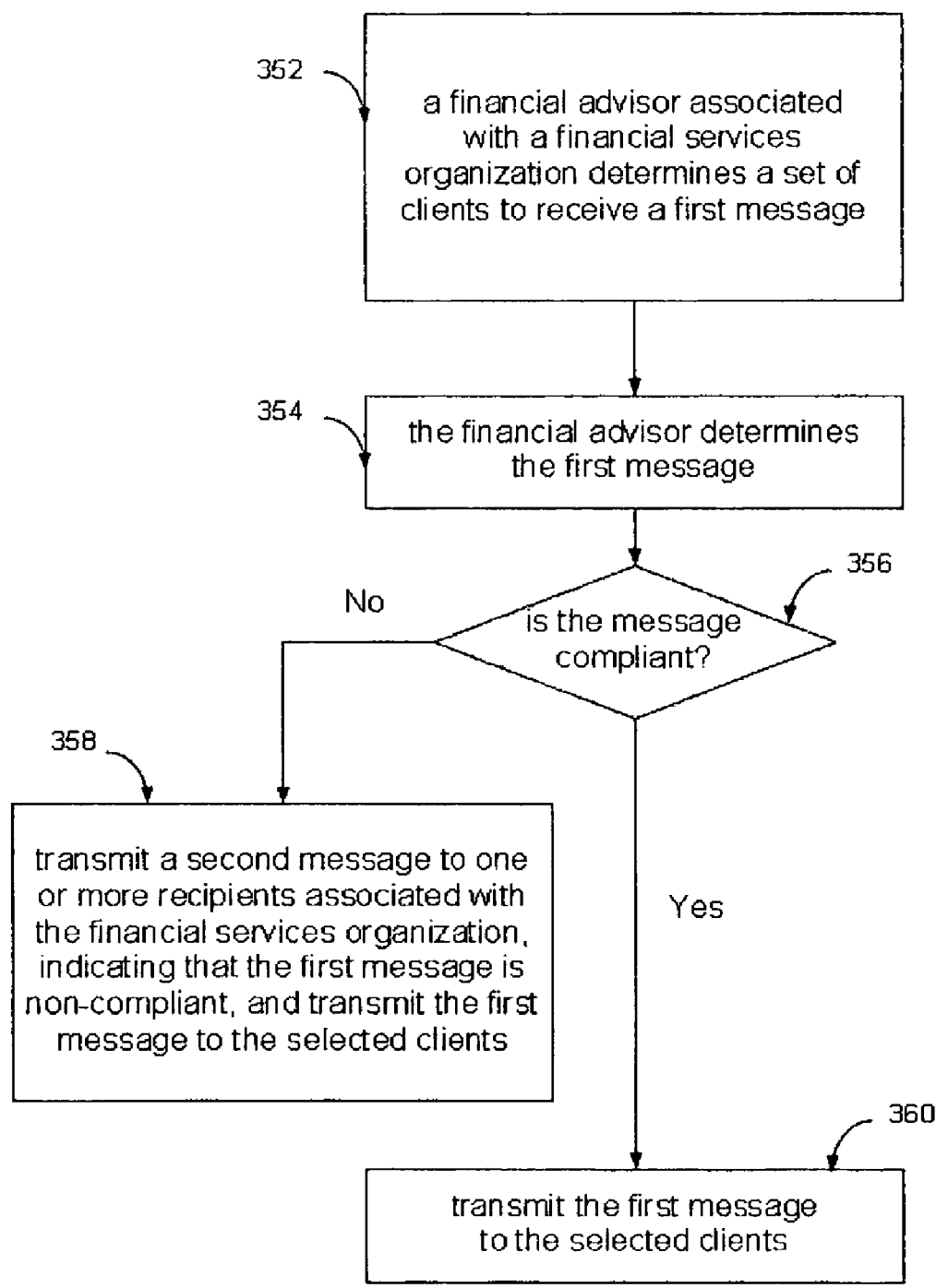

Fig. 11          1100
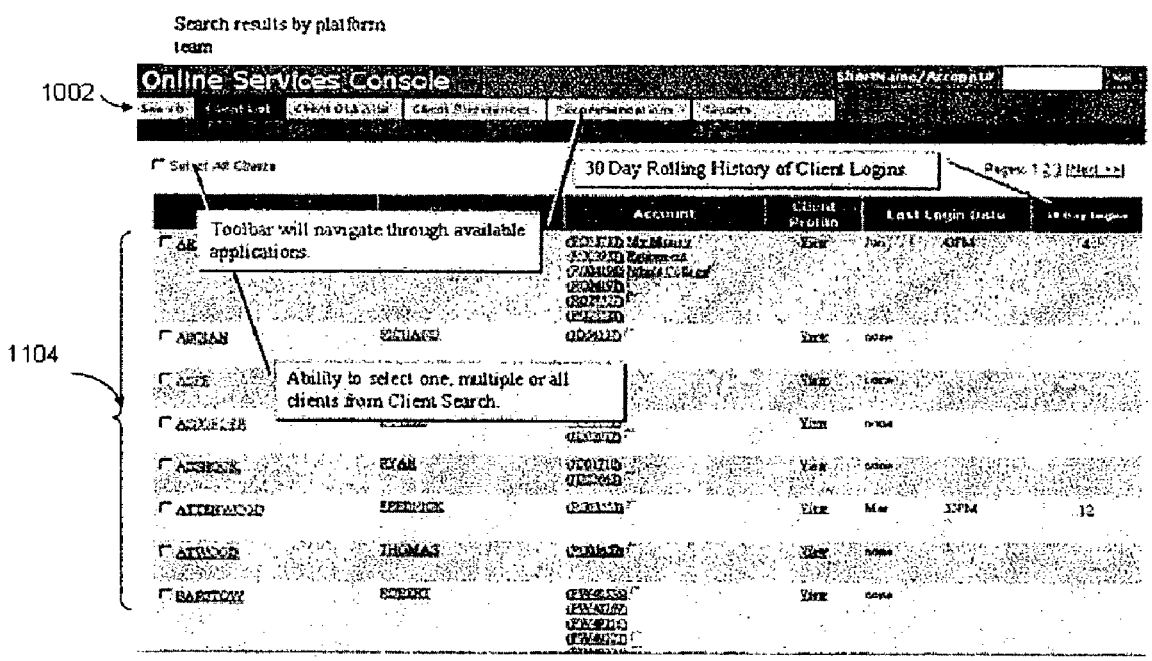

Fig. 12    1200
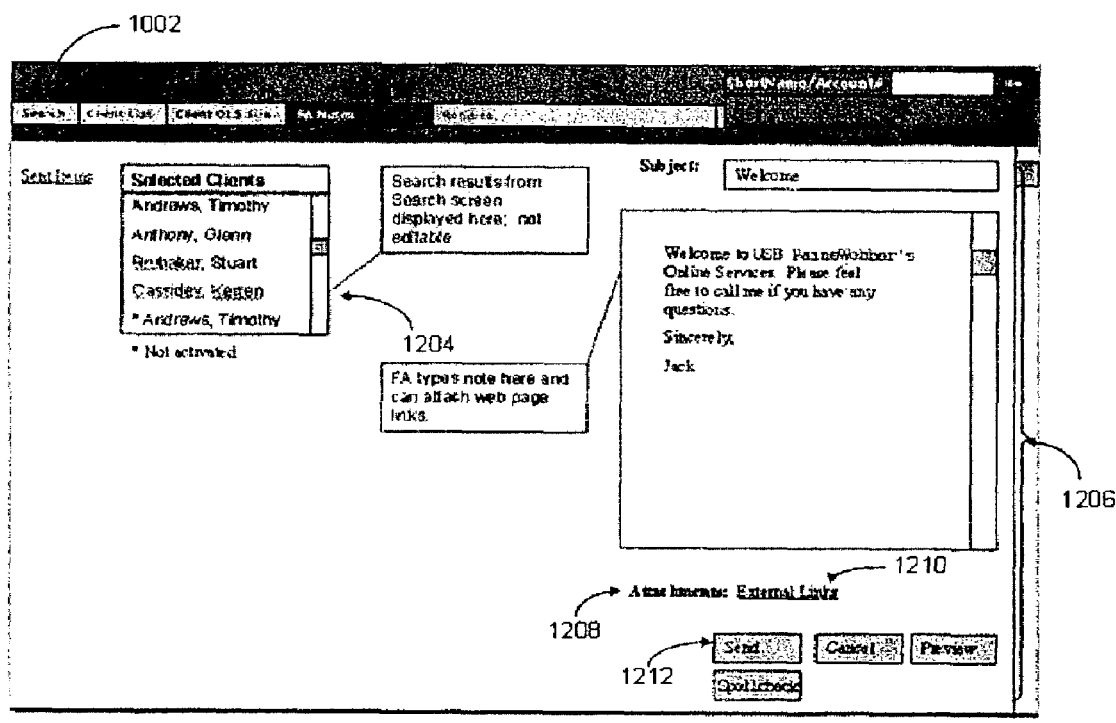

Fig. 13                               1300
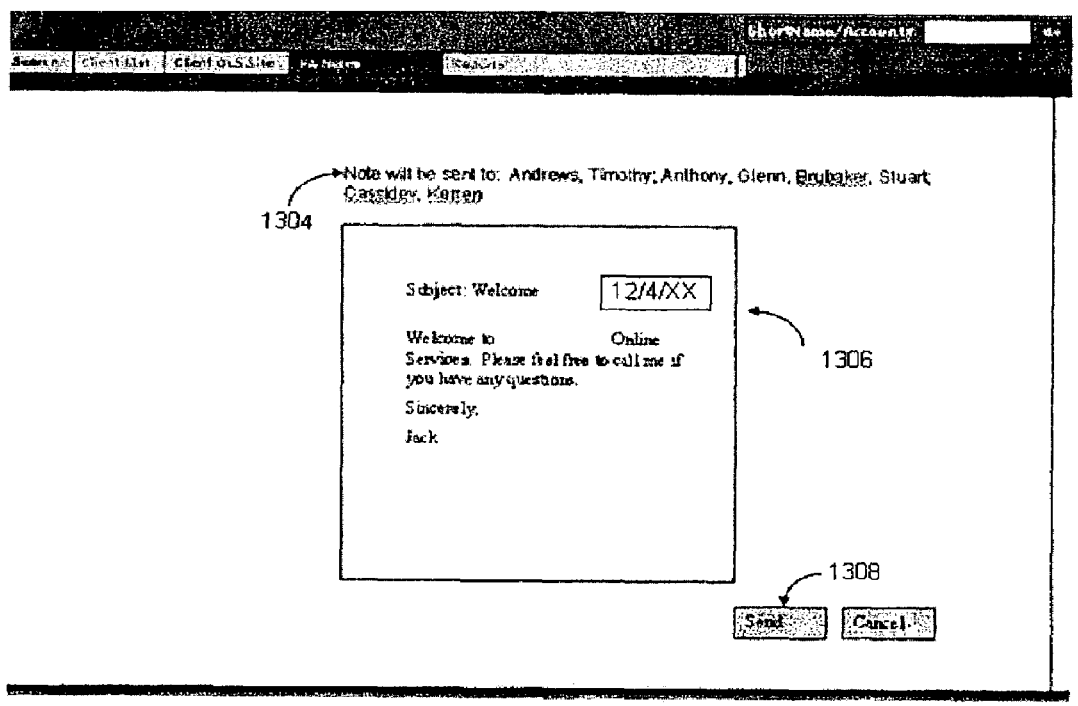

Sent Items          Sent notes by FA (name)

| To. | Subject. | Sent. |
|---|---|---|
| ☐ Andrews, Timothy | IRA withdrawal | Mon 10/2/00 1:20 pm |
| ☐ Andrews, Timothy | Microsoft | Fri 9/29/00 8:00 am |
| ☐ Andrews, Timothy | Technology Research | Thu 9/28/00 12:00 pm |
| ☐ Anthony, Glenn | Technology Research | Thu 9/28/00 12:00 pm |
| ☐ Brubaker, Stuart | Technology Research | Thu 9/28/00 12:00 pm |
| ☐ Cassidy, Karen | Technology Research | Thu 9/28/00 12:00 pm |

1402

Check all   Clear all

[Delete]  Checked notes

Click on note and note renders in this frame.

Personalization

| Home | File Index | Upload Files | | | Content Management | | | | Change Password | CMA Help | Log Out |

You are logged on as fav2admin.

Create Content → [FA Comments ▼] → View Content

| Edit | Title | Author | Status | Approved | Modified Date | Launch Date | Exp Date | Delete | Launch | Expire | Approve |
|------|-------|--------|--------|----------|---------------|-------------|----------|--------|--------|--------|---------|
| | new note title | fav2admin | Live | Y | 05/21/ | 05/21/ 05:00PM | Never | ☐ | ☐ | ☐ | ☐ |
| | note 2 | fav2admin | Live | Y | 05/21/ | 05/21/ 05:00PM | Never | ☐ | ☐ | ☐ | ☐ |

2006

FINANCIAL ADVISOR MESSAGING IN A NETWORKED COMPUTER SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

The present invention relates to financial business systems; and more particularly, to systems and methods for financial advisor messaging in a networked computer system.

2. Description of the Related Art

Systems for providing financial services in networked computer systems, such as through the Internet, continue to grow in demand and importance. Increasingly, investors, traders, and other clients of financial services organizations access and utilize various financial information and services through computer applications. These applications are typically made available through computers of the clients by connection over a network to computers associated with the financial services organization. Financial advisors can play a key role in financial services systems. Herein, the term "financial advisor" can include any individual or group of individuals, including brokers, that provide any type of financial services, advice, or other assistance to clients, including services relating to trading, investing, commerce and banking. Additionally, herein, the term "financial services organization" includes entities that provide financial assistance, services, or products of any kind, including entities that facilitate or assist in trading, investing, commerce, and banking. Furthermore, herein, the term "clients" includes individuals, groups, or other entities that utilize the services, products or assistance provided by financial services organizations or financial advisors.

Typically, a financial advisor is associated with a financial services organization, and clients of the financial advisor typically have accounts with the financial services organization which may be accessible by the clients, for example, through the Internet. Maintaining and enriching relationships and communications between clients and their financial advisors can be closely linked to the success of the business. In fact, increasing the effectiveness and efficiency of communications between financial advisors and clients can have a dramatic positive impact on the arrangement. Furthermore, as systems increasingly involve remote electronic access by clients to financial services, and to communications with financial advisors, effective electronic communications over networked computer systems naturally becoming essential.

Often, however, a financial advisor who is associated with a financial services organization is uncertain whether messages sent to clients conform with the practices and requirements of the financial services organization, or is not aware if such messages are not compliant. In some cases, different departments or sub-entities within a financial services organization can each have requirements concerning financial advisor to client messaging, such as, for example, a legal department, a sales department, a marketing department, and the like. It can be difficult, inefficient, or risky for financial advisors to electronically communicate with clients without such communications being approved as compliant by the financial services organization prior to being transmitted to clients, or without the financial advisor being aware of any non-compliant messages that are sent.

In addition to compliance concerns, financial advisors frequently need to send a single message to numerous clients, and need to search for or otherwise efficiently and accurately determine the appropriate set of clients for a particular message.

Various computerized financial systems are known in the art. U.S. Pat. No. 6,385,595 issued on May 7, 2002 to Kolling et al., entitled, "Electronic Statement Presentment System," is directed to a system for use in electronic invoicing, including templates for electronic statements, and validation and sending of such statements.

U.S. Pat. No. 6,349,290 issued on Feb. 19, 2002 to Horowitz et al., entitled, "Automated System and Method for Customized and Personalized Presentation of Products and Services of a Financial Institution," discusses an interactive financial system which automatically generates advice based on information about customers.

U.S. Pat. No. 6,223,983 issued on May 1, 2001 to Kjonaas et al. is directed to an interactive financial system allowing remote access to various financial information and services.

U.S. Patent Application Publication Number 2002/0065752, published on May 30, 2002 to Lewis, entitled, "Financial Consolidation and Communication Platform," discusses a financial data reporting system including an updated, customer accessible database.

U.S. Patent Application Publication Number 2002/077940, published on Jun. 20, 2002 to Riley, entitled, Method and Apparatus for Creation and Transmission of Financial Statement Data," discusses a system for extracting and sorting financial data to generate electronic customer billing statements.

U.S. Patent Application Publication Number 2002/0055835, published on May 9, 2002 to Carcoba Olivares, et al., entitled, System and Method for Integrated Communications, Fund Transfers, Confirmation and E-Commerce Applications," discusses an integrated system of electronic or computerized devices to facilitate communication among remote users.

There remains a need in the art for more effective and efficient financial advisor messaging systems and methods.

SUMMARY OF THE INVENTION

The present invention provides systems and methods for financial advisor messaging in a networked computer system.

In one embodiment, the invention provides, in a networked computer system in which financial services are provided by a financial services organization, a method for managing messaging from a financial advisor associated with the financial services organization to a set of one or more clients of the financial advisor, the financial advisor and the clients being able to utilize computers connected to the network, the messaging being in connection with one or more trading accounts of the one or more clients. The method includes the financial advisor determining the clients to receive a message, the financial advisor determining the message, and the message being transmitted over the network to be accessible by the clients. Prior to the transmission of the message, the message is required to be determined to be compliant.

In another embodiment, the invention provides, in a networked computer system in which financial services are provided by a financial services organization, a method for managing messaging from a financial advisor associated with the financial services organization to a set of one or more clients of the financial advisor, the financial advisor and the clients being able to utilize computers connected to the network, the messaging being in connection with one or more trading accounts of the one or more clients. The method includes the financial advisor determining the clients to receive a message, the financial advisor determining the message, and the message being transmitted over the network to be accessible by the clients. Prior to the transmission of the message, the message is required be determined to be compliant by the financial services organization.

In another embodiment, the invention provides, in a networked computer system in which financial services are provided by a financial services organization, a system for managing messaging from a financial advisor associated with the financial services organization to a set of one or more clients of the financial advisor, the financial advisor and the clients being able to utilize computers connected to the network, the messaging being in connection with one or more trading accounts of the one or more clients. The system includes a network and, at least one server computer connected to the network, and a plurality of client computers connected to the network. A financial advisor, using one of the client computers, is provided with the ability to determine the clients to receive a message, determine the message, and transmit the message over the network to be accessible by the clients by using client computers. Prior to the transmission of the message, the message is required be determined to be compliant by the financial services organization.

In another embodiment, the invention provides computer usable media storing program code which, when executed on one or more computerized devices, causes the computerized devices to execute, in a networked computer system in which financial services are provided by a financial services organization, a method for managing messaging from a financial advisor associated with the financial services organization to a set of one or more clients of the financial advisor, the financial advisor and the clients being able to utilize computers connected to the network, the messaging being in connection with one or more trading accounts of the one or more clients. The method includes the financial advisor determining the clients to receive a message, the financial advisor determining the message, and the message being transmitted over the network to be accessible by the clients. Prior to the transmission of the message, the message is required be determined to be compliant by the financial services organization.

In another embodiment, the invention provides, in a networked computer system in which financial services are provided by a financial services organization, a method for managing messaging from a financial advisor associated with the financial services organization to a set of one or more clients of the financial advisor, the financial advisor and the clients being able to utilize computers connected to the network, the messaging being in connection with one or more trading accounts of the one or more clients. The method includes the financial advisor determining the clients to receive a first message, the financial advisor determining the first message, determining whether the first message is compliant according to the financial services organization, transmitting the first message over the network to be accessible by the clients, and, if the first message is determined to by non-compliant, transmitting a second message over the network to at least one recipient associated with the financial services organization, the second message indicating that the first message is non-compliant.

Additional aspects of the present invention will be apparent in view of the description which follows.

BRIEF DESCRIPTION OF THE FIGURES

The invention is illustrated in the Figures of the accompanying drawings which are meant to be exemplary and not limiting, in which like references are intended to refer to like or corresponding parts, and in which:

FIG. 3 is a flow diagram depicting a method according to one embodiment of the invention;

FIG. 3A is a flow diagram depicting a method according to one embodiment of the invention;

FIG. 11 depicts a graphical user interface according to one embodiment of the invention, allowing client selection from search results;

FIG. 12 depicts a graphical user interface according to one embodiment of the invention, allowing client selection from client search results, and message determination;

FIG. 13 depicts a graphical user interface according to one embodiment of the invention, allowing confirmation of sending of a message determined by a financial advisor;

FIG. 14 depicts a graphical user interface according to one embodiment of the invention, providing a list of messages sent by a financial advisor;

FIG. 19 depicts a graphical user interface according to one embodiment of the invention, in which a message is created for publication;

FIG. 20 depicts a graphical user interface according to one embodiment of the invention, providing a list of published messages.

DETAILED DESCRIPTION OF THE INVENTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

The present invention provides systems and methods for financial advisor messages in a networked computer system. A financial advisor associated with a financial services organization determines clients to receive a message, the financial advisor determines the message, and the message is transmitted over the network to be accessible by the clients. Methods are provided in which the message is required to be determined to be compliant prior to transmission to the clients. Methods are also provided in which individuals associated with the financial services organization, such as the financial advisor, are notified of a non-compliant message.

The systems and methods described in "System and Method for Providing Integrated Applications Availability in a Networked Computer System," filed on Jan. 23, 2003, as well as application Ser. No. 09/696,693, filed Oct. 25, 2000, entitled, "System for Providing Financial Services," which claims the benefit of U.S. Provisional Application Ser. No. 60/182,364, filed Feb. 14, 2000, entitled, "System for Providing Financial Services," contain features which can be used in the practice of the present invention and are hereby incorporated herein by reference in their entirety.

In addition, the systems described in following published international applications contain features which can be used in the practice of various embodiments of the present invention, and each is hereby incorporated herein by reference in its entirely: published international application no. WO 01/50317, published on Jul. 12, 2001 and entitled, "On-Line Trading System"; published international application no. WO 01/61590, published on Aug. 23, 2001 and entitled, "System for Providing Financial Services"; published international application no. WO 01/61589, published on Aug. 23, 2001 and entitled, "Browser Interface and Network Based Financial Services System"; and, published international application no. WO 01/61535, published on Aug. 23, 2001 and entitled, "System and Method for Execution of Trades Made Pursuant to Stock Option and Purchase Plans."

Figure 1:
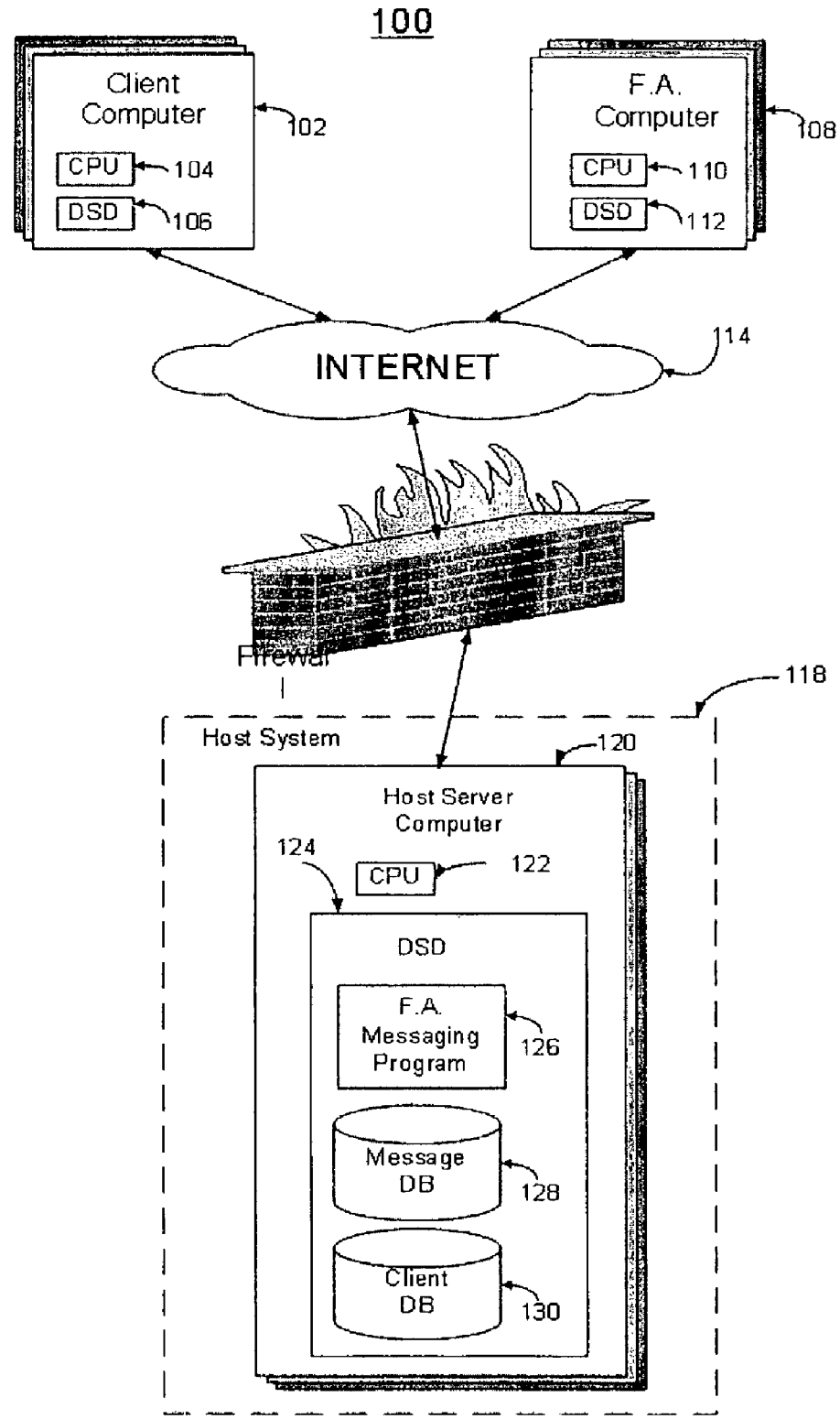
FIG. 1 a block diagram depicting a networked computer system, according to one embodiment of the invention.

FIG. 1 is a block diagram depicting a networked computer system 100, according to one embodiment of the invention. As depicted, the Internet 114 connects one or more client computers 102, one or more financial advisor computers 108, and a host system 118. The host system 118 includes one or more host server computers 120. One or more firewalls 116, as known in the art, such as a packed filter firewall, circuit gateway firewall, application gateway firewall, or trusted gateway firewall, which can include various hardware and software, provides secured access via the Internet 114 to the host system 118. Although the Internet 114 is depicted, the invention contemplates embodiments in which the computers 102, 108 and the host system 118 are connected in other ways, such as by other networks which can include personal area networks (PANs), local area networks (LANs) or wide area networks (WANs), and the invention contemplates embodiments in which no Internet connection is provided. In addition, in some embodiments, financial advisor computers can exist within the host system 118. As depicted, the host server computers 120 represent the computers themselves as well as any networks, connections, or communication channels between them.

Each of the computers 102, 108, 120 comprises one or more Central Processing Units (CPUs) 104, 110, 122 and one or more data storage devices 106, 112, 124. The client computers 102 and financial advisor computers 108 generally comprise display devices such as monitors or any form other video, graphical, visual or other device producing a display.

The data storage devices 106, 112, 124 can comprise various amounts of RAM for storing computer programs and other data. The data storage devices 102, 112 of the client computers 102 and the financial advisor computers 108 can include an Internet browser program or application, such as Internet Explorer® by Microsoft®. In addition, the computers 102, 108, 120 can include other components typically found in computers, including one or more output devices such as monitors, other fixed or removable data storage devices such as hard disks, floppy disk drives and CD-ROM drives, and one or more input devices, such as mouse pointing devices, non-mouse pointing devices, or other devices allowing selection from a display device, and keyboards.

Generally, the computers 102, 108, 120 operate under and execute computer programs under the control of an operating system, such as Windows, Macintosh, UNIX, etc. Generally, the computer programs of the present invention are tangibly embodied in a computer-readable medium, e.g., one or more data storage devices attached to a computer. Under the control of an operating system, computer programs may be loaded from data storage devices into computer RAM for subsequent execution by the CPU. The computer programs comprise instructions which, when read and executed by the computer, cause the computer to perform the steps necessary to execute elements of the present invention.

As depicted, the data storage device 124 of the host server computer 114 comprises a financial advisor messaging program 126, a message database 128, and a client database 130. The a financial advisor messaging program 126 represents all programming, software, applications, application programming interface (API) tools or other tools residing in or otherwise affecting operation of the host server computer 120 to allow the host server computer 120 to facilitate providing the systems and methods of the invention as described herein, which can include various financial advisor messaging functions. The message database 128 is used to store data including and relating to messages used in systems and methods of the invention as described herein. Additionally, the client database 130 is used to store various information about financial advisor or financial services organization clients and their account information used in systems and methods of the invention as described herein.

As previously stated, the host server computers 120 can include one or several computers, and it is likewise to be understood that the financial advisor messaging program 126, message database 128, and client database 130 can, in different embodiments, exist on a single host server computer or several computers, or be spread out between several computers. It is further to be understood that the host system 118 can include hardware, software, and other components not depicted in FIG. 1. Additionally, it is to be understood that the host server computers 120 can include different types of host server computers, with various functions. Examples of host systems 118 including a variety of components and computers are provided, for example, in FIG. 2 as well as in previously incorporated by reference U.S. application Ser. No. 09/606,693.

Figure 2:
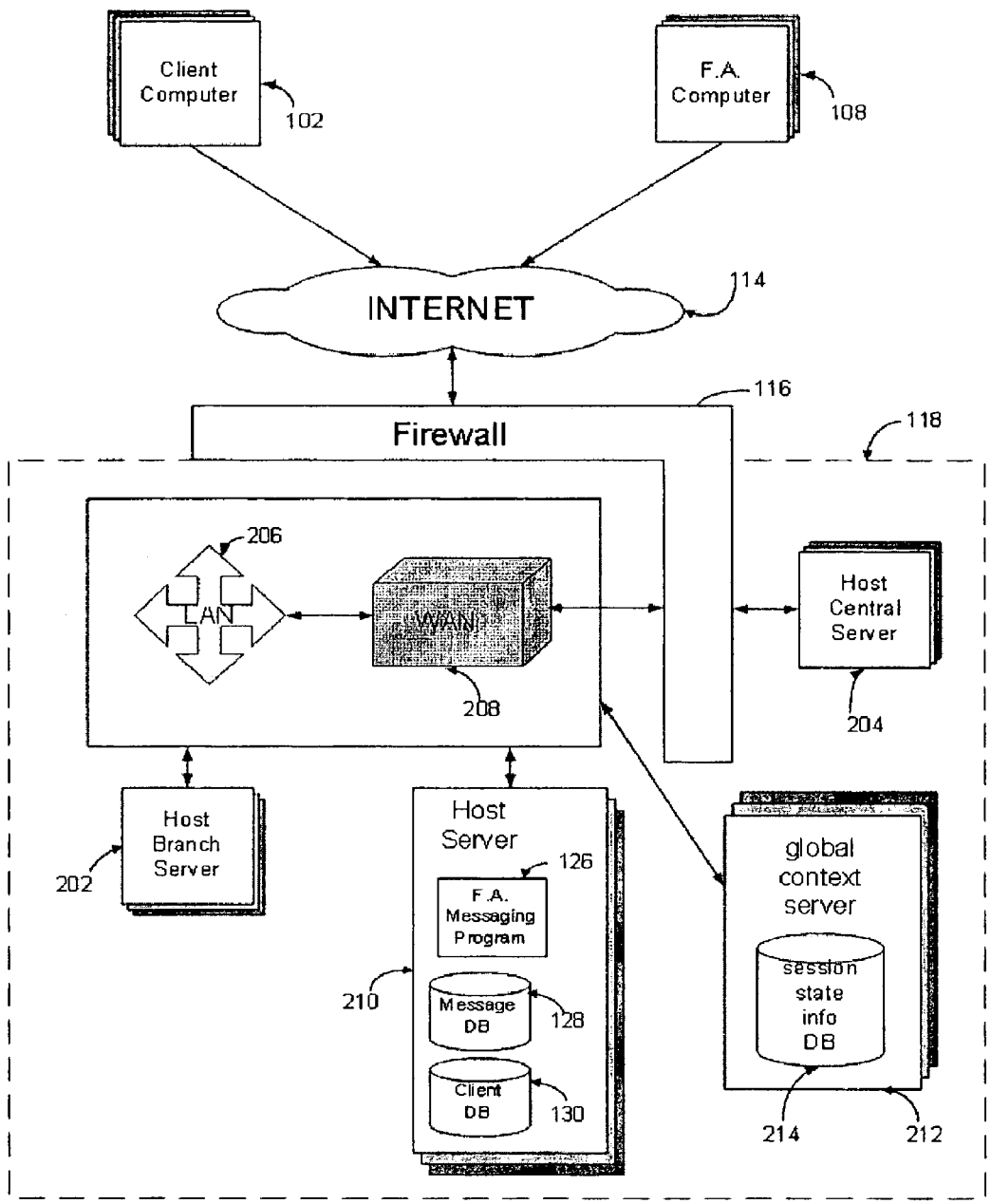
FIG. 2 is a block diagram depicting one embodiment of a networked computer system in accordance with the system depicted in FIG. 1.

FIG. 2 is a block diagram depicting one embodiment of a networked computer system 200 in accordance with the system 100 depicted in FIG. 1. The host server computers 120 depicted in FIG. 1 are depicted in FIG. 2 as including host branch server computers 202, host central server computers 204, and host server computers 210, as well as LAN 206 and WAN 208. As depicted in FIG. 2, the host server computer 210 includes the financial advisor messaging program 126, the message database, and the client database 130 as depicted in FIG. 1. In addition, in some embodiments of the invention, such as in the system 200 depicted in FIG. 2, one or more global context server computers 212 including one or more session state information databases 214 are also included. The more global context server computers 212 are used in embodiments of the present invention that include integrated applications availability as described in "System and Method for Providing Integrated Applications Availability in a Networked Computer System," previously incorporated by reference. It is to be understood, however, that in some embodiments of the invention such integrated applications availability is not provided, and the global context servers 212 are not included.

Many of the elements depicted in FIG. 2 correspond generally to elements described in detail in previously incorporated by reference and related U.S. application Ser. No. 09/606,693, filed Oct. 25, 2000, and entitled, "System for Providing Financial Services." Specifically, as depicted and described in U.S. application Ser. No. 09/606,693 particularly with reference to the embodiment depicted in FIG. 2 therein, branch server computers can include one or more network based server computers, one or more database server computers, and one or more market data server computers. Additionally, central server computers can include one or more security server computers, one or more market data server computers, one or more master entitlement database computers, one or more product server computers, and one or more mainframe computers. Other server computers can include one or more Internet investment product server computers. Various features as described in U.S. application Ser. No. 09/606,693 are generally applicable to the system 200 depicted in FIG. 2 herein, including, for example, functionality and implementation details described with respect to host server computers, entitlement and authentication, software, application interface, and workstation client computers.

FIG. 3 is a flow diagram depicting a method 300 according to one embodiment of the invention. The programming and applications to enable, the method 300 can be provided, for example, using the financial advisor messaging program 126 depicted in FIGS. 1 and 2. At step 302, a financial advisor associated with a financial services organization determines a set of clients to receive a message. The financial advisor can use, for example, one of the financial advisor computers 108, connected through the Internet 114 to the host system 118, which can be a financial services organization system. The set of clients can be determined, for example, by accessing or searching the client database 130.

At step 304, the financial advisor determines a message to be received by the clients determined at step 302. This can include, for example, the financial advisor composing a message or selecting a message using the message database 128 as depicted in FIG. 1.

At step 306, the message is transmitted over a network to be accessible by the clients, the message being required to be determined to be compliant by the financial services organization prior to the transmission. For example, if the message was selected at step 304, it may have been selected from a set of messages, each of which having already been determined to be compliant with requirements or practices of the financial services organization. Alternatively, if the message was composed at step 304, the message may be transmitted to one or more individuals or groups within the financial services organization for approval prior to being prior to being transmitted to be accessible by the clients. If the composed message is determined to be non-compliant, the financial advisor may be unable to transmit the message. In some embodiments, the financial advisor may be given an opportunity to edit the message and to have the message once again checked for compliance. In other embodiments, no opportunity to edit the message is provided.

In some embodiments of the invention, the compliance determination is partly or fully automated. For example, in some embodiments, the compliance determination is performed using an assentor system, which can be part of or include part of the FA messaging program 126, as depicted in FIG. 1. Furthermore, in some embodiments, the assentor program further used to transmit messages in accordance with the invention.

FIG. 3A is a flow diagram depicting a method 350 according to one embodiment of the invention. In the embodiment depicted in FIG. 3A, it is not required that a message from a financial advisor be determined to be compliant prior to being transmitted so as to be accessible by selected clients. Rather, as is described more specifically as follows, in some embodiments, if a non-compliant message is sent, at least one member of the financial services organization is sent a message to advise of this fact.

At step 352, a financial advisor associated with a financial services organization determines a set of clients to receive a first message. At step 354, the financial advisor determines the first message to be received by the clients determined at step 352.

At step 356, it is determined whether the first message is compliant with requirements or procedures of the financial services organization. In some embodiments, this determination is performed automatically, such as by the assentor system.

If the message is determined to be compliant, then, at step 360, the first message is transmitted to the selected clients.

If the message is determined to be non-compliant, then, at step 358, in addition to the first message being transmitted to the selected clients, a second message is transmitted to one or more recipients associated with the financial services organization, the second message indicating that the first message is non-compliant. In some embodiments, the second message includes part or all of the first message. In some embodiments, the one or more recipients include, for example, the financial advisor and a manager of the financial advisor. Having been given an indication that the first message is non-compliant, the recipients of the second message, or any of them, can then take any action that may be appropriate.

In some embodiments, the transmitting of the first and second messages is automatically performed by the assentor system.

In some embodiments of the invention, the first message and the second message are transmitted simultaneously or substantially simultaneously. In such embodiments, the compliance of the first message may not be determined prior to transmission of the first message to be accessible by the clients.

Figure 4:
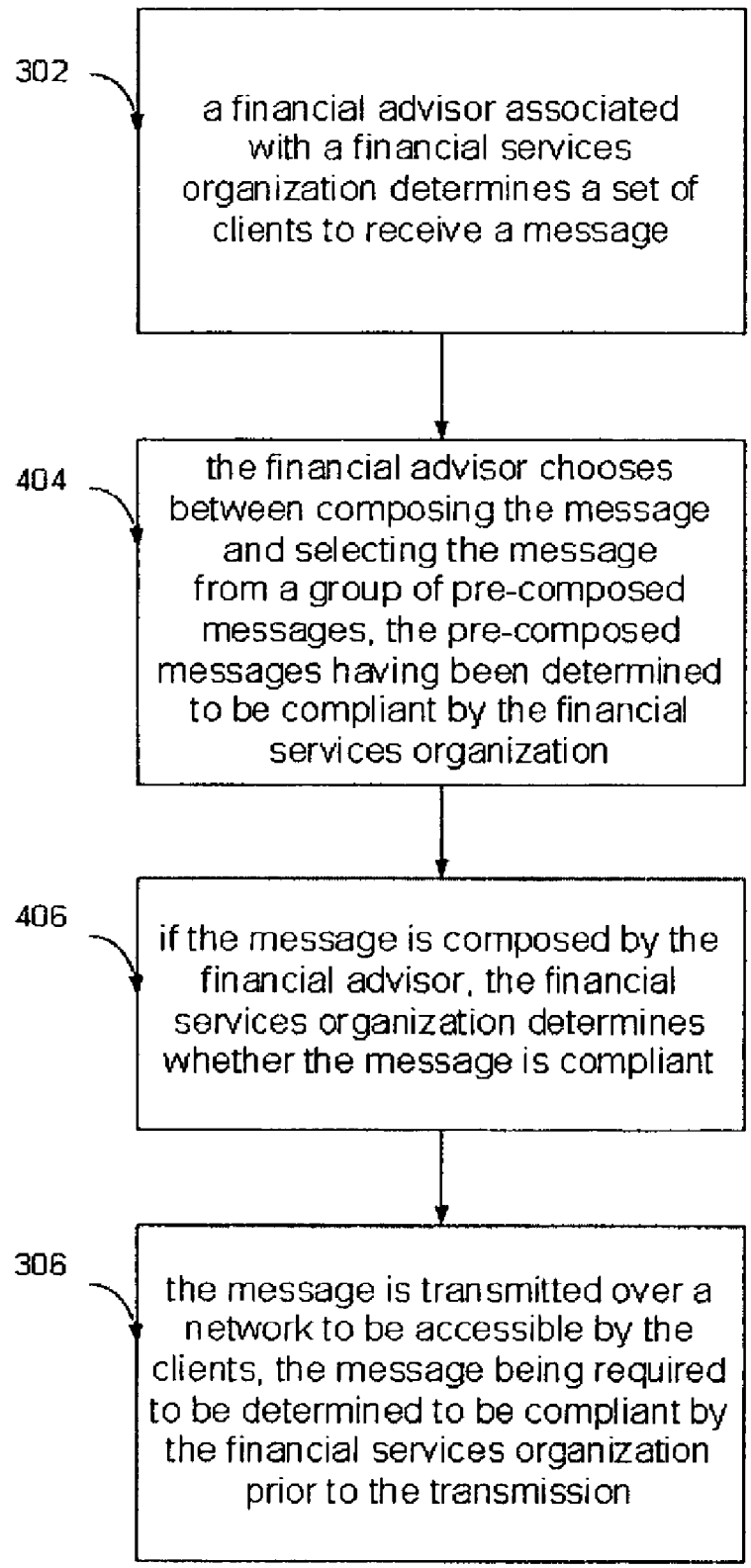
FIG. 4 is a flow diagram depicting one embodiment of the method depicted in FIG. 3.

FIG. 4 is a flow diagram depicting one embodiment of the method depicted in FIG. 3. Step 302 is described above with reference to FIG. 3. At step 404, the financial advisor chooses between composing the message and selecting the message from a group of pre-composed messages, the pre-composed messages having been determined to be compliant by the financial services organization.

At step 406, if the message is composed at step 404, the financial services organization determines whether the message is compliant. Once the message is determined to be compliant, at step 306, as described above with reference to FIG. 3, the message is transmitted over a network to be accessible by the clients.

Figure 5:
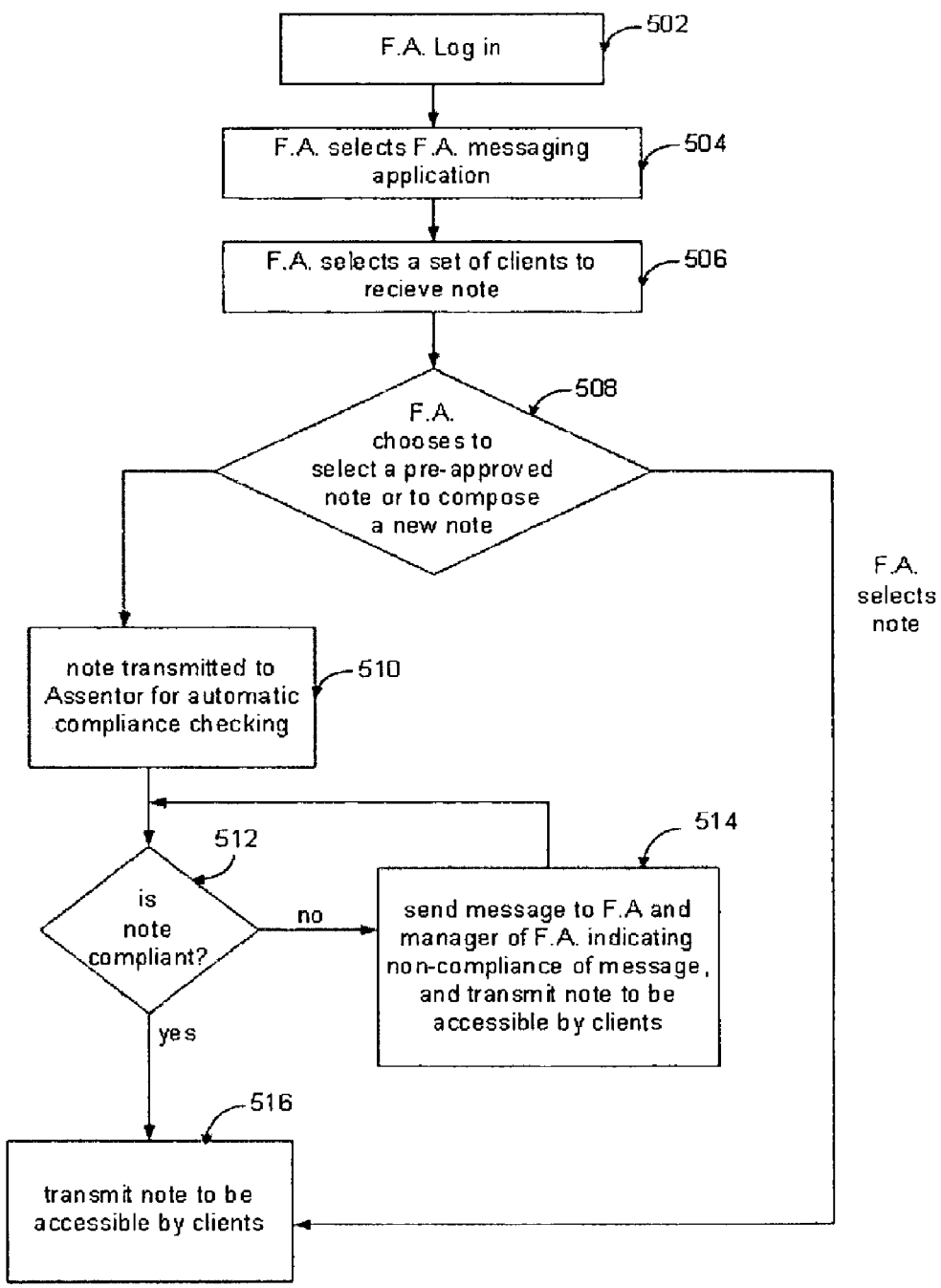
FIG. 5 is a flow diagram depicting a method according to one embodiment of the invention.

FIG. 5 is a flow diagram depicting a method 500 according to one embodiment of the invention. At step 502, a financial advisor logs into a host computer system, using a password or by some other secure means. Step 504 can include, for example, the financial advisor logging in over the Internet or some other network.

At step 504, the financial advisor selects a financial advisor messaging application, which can be provided, for example, using the financial advisor messaging program 126 as depicted in FIGS. 1 and 2. Step 504 can include, for example, the financial advisor choosing a link, from a home or start Web page provided upon log in to a host system, to a Web page allowing access to the financial advisor messaging application.

At step 506, the financial advisor selects a set of clients to receive a note. The note can simply be an electronic message from the financial advisor.

At step 508, the financial advisor chooses to select a pre-approved note, which is a note that has been determined to be compliant by a financial services organization with which the financial advisor is associated, or to compose a new note. If the financial advisor chooses to select a pre-approved note, the method 500 proceeds to step 516, at which the note is transmitted to be accessible by the clients. If the financial advisor instead chooses to compose a note, the method 500 proceeds to step 510, at which the note is transmitted for automatic checking to determines whether the note is in compliant according the financial services organization, such as by being in compliance with requirements or procedures of the organization. The transmission and compliance checking can take many forms, as can the pre-approval of selected notes. In some embodiments, transmission and compliance checking is performed automatically, for example, by the assentor system, as described above with reference to FIGS. 3 and 3A. In some embodiments, transmission and compliance checking can include simultaneous transmission to a number of individuals or groups that must all approve the note, or it can include a number of transmissions to and from a number of individuals or groups, which can be, for example, according to a workflow plan. In some embodiments, transmission includes, for example, delivery to a Web page or Web site connected or associated with a client's online account, and a client's online account number, for instance, can be used as a unique identifier.

At step 512, a determination is made as to whether the note is compliant. This can include, for example, a determination as to whether the note conforms to requirements, procedures, or practices of the financial services organization. In some embodiments of the invention, the determination is made automatically, such as, for example, by the assentor system. In other embodiments, a compliance group can make the determination. If the note is determined to be compliant, the method 500 proceeds to step 516, as described above. If the note is determined to be non-compliant, the method 500 proceeds to step 514. At step 514, a message is sent to one or more individuals or groups associated with the financial services organization, such as, for example, the financial advisor and a manager of the financial advisor, indicating that the note is non-compliant. In addition, at step 514, the note is transmitted to be accessible by the selected clients.

Figure 6:
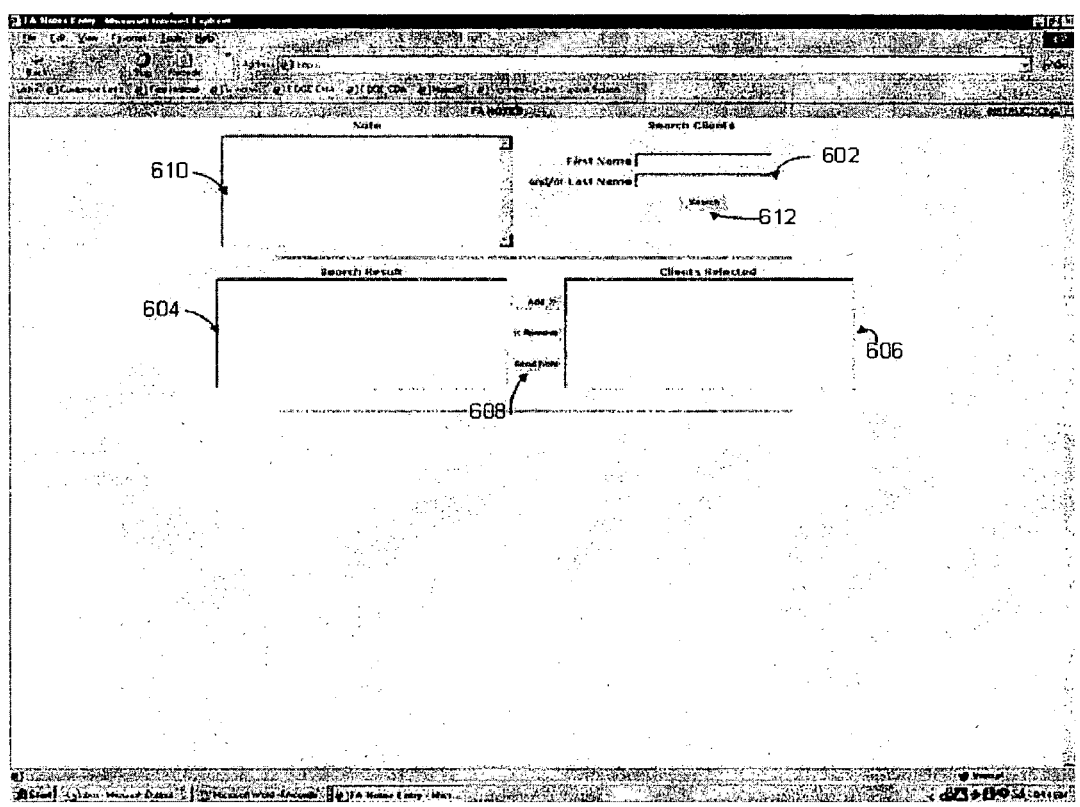
FIG. 6 depicts a graphical user interface according to one embodiment of the invention, allowing client selection and message determination.

FIG. 6 depicts a graphical user interface 600 according to one embodiment of the invention, allowing client selection and message determination. As depicted, the graphical user interface 600 is presented through a Web page accessed by the financial advisor. A number of data entry forms or areas 602, 604, 606, 610 are provided. Area 602 allows the financial advisor to search for a particular client by name or to access a more sophisticated search engine or tool by selected search button 612. The search button 602 can be, for example, a link to a Web page at which the financial advisor can perform client search queries based on client information which can be stored in a client database, such as the client database 130 as depicted in FIGS. 1 and 2. In some embodiments, at the conclusion of such a search, the financial advisor will once again be presented with the Web page including the graphical user interface 600, this time with the results of the search used to pre-populate search result area 604, such as with client e-mail addresses, for example.

The data entry area 610 can be used by the financial advisor to compose a new message, or note, which note will be, for example, transmitted to a compliance group for compliance approval before the note will be allowed to be transmitted so as to be accessible by the clients selected by the financial advisor. Buttons 608 include an add button, a remove button, and a send note button. The add and remove buttons allow the financial advisor to add or remove one or more clients to or from a selected group, via a separate Web page or otherwise. The send button allows the financial advisor to send the note, or to attempt to do so. In some embodiments, if the note has not been determined to be compliant, the financial advisor will be unable to send the note, or the note will be prevented from being sent until it is determined to be compliant.

Figure 7:
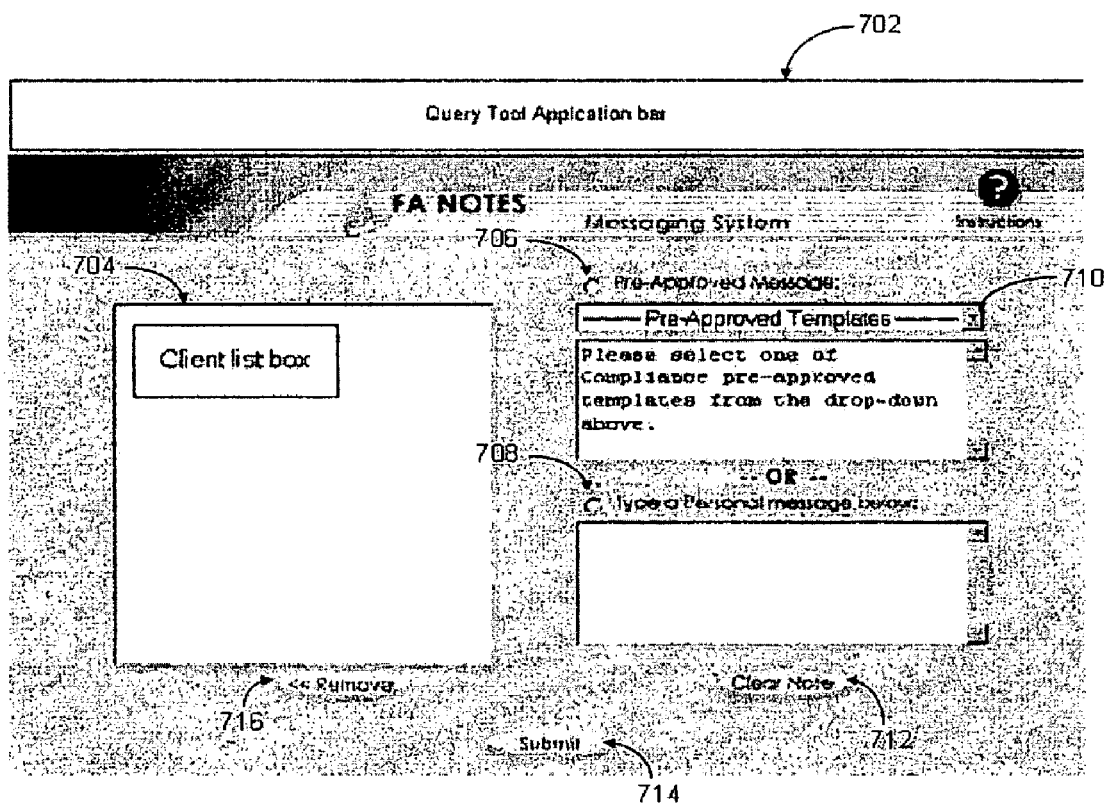
FIG. 7 depicts a graphical user interface according to one embodiment of the invention, allowing client selection, message selection and message composition.

FIG. 7 depicts a graphical user interface 700 according to one embodiment of the invention, allowing client selection, message selection and message composition. As depicted, the financial advisor messaging application is accessible via a query tool application bar 702 which can allow the financial advisor to select and access any of a number of applications and tools in connection with a financial services organization with which the financial advisor is associated. Boxes 704 and 708 are similar to data entry areas 606 and 610, respectively, as depicted in FIG. 6. Check boxes 706, 708 allow the financial advisor to choose either to select a pre-approved note template, which is a pre-composed note that has already been determined to be compliant, or to compose a new note. As depicted, if the financial advisor elects to select a pre-approved note, a drop down menu (not shown) will appear with a list of selectable notes or note titles. In some embodiments, selected messages cannot be modified by the financial advisor.

Figure 8:
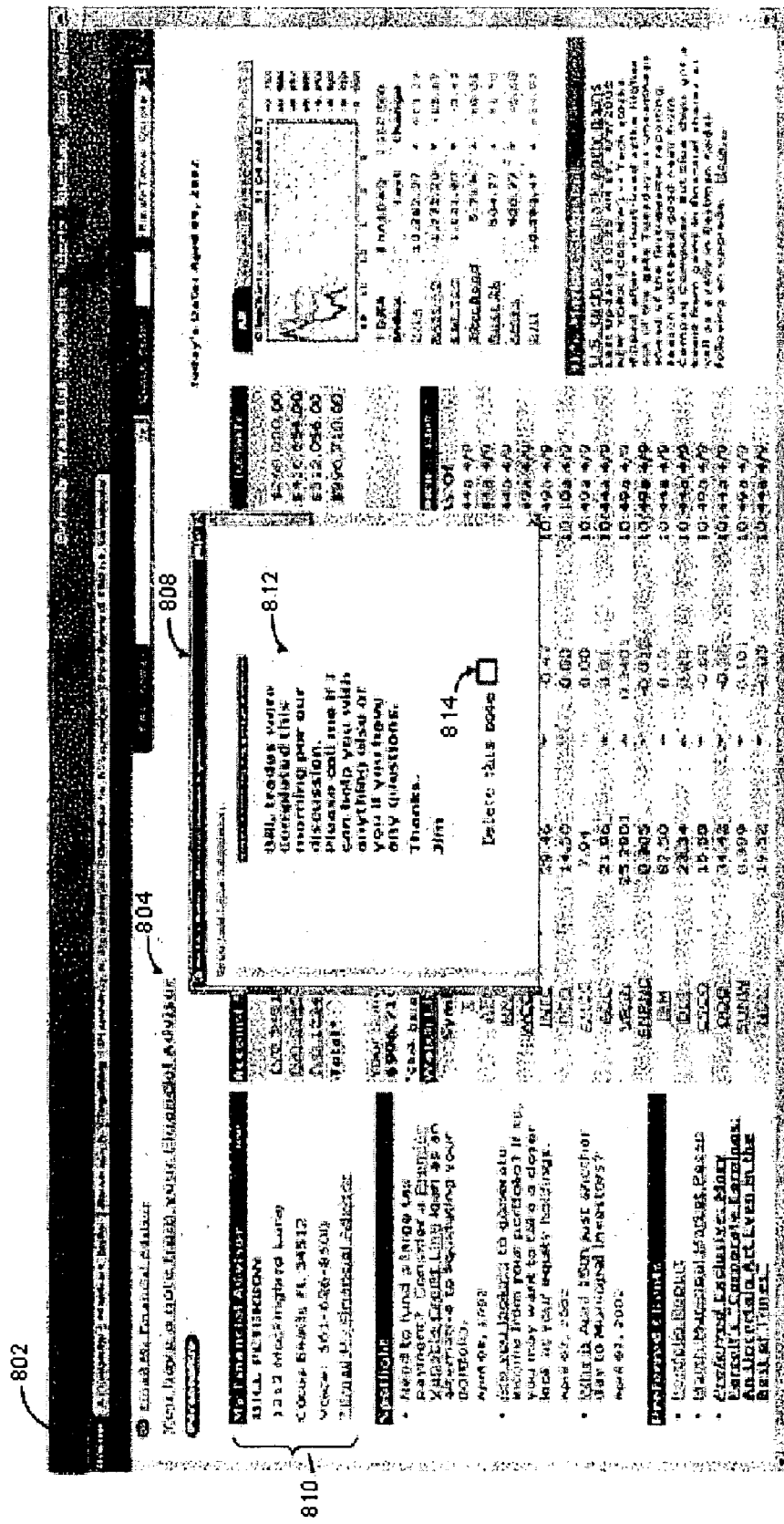
FIG. 8 depicts a graphical user interface according to one embodiment of the invention, in which a client is electronically notified of a message from a financial advisor.

FIG. 8 depicts a graphical user interface 800 according to one embodiment of the invention, in which a client is electronically notified of a message from a financial advisor. The graphical user interface 800 is a Web page which presents various financial or other applications to user in an integrated fashion via different contentlets. Such an integrated system, which can be used in some embodiments of the present invention, is described in "System and Method for Providing Integrated Applications Availability in a Networked Computer System," previously incorporated by reference.

As depicted in FIG. 8, a hyperlink 804 appears in the graphical user interface 800, stating to the user, "You have a note from your financial advisor." In some embodiments of the invention, notes are transmitted to Web pages or Web sites of clients in connection with their accounts with a financial services organization. When clients access their accounts, they are provided with a notification that a message has been sent to them from the financial advisor. FIG. 8 includes a Web page accessed by a client of the financial services organization, and, as indicated by tab 802, the Web page is a home page. Selecting the hyperlink 804 causes window 808 to appear, which includes the note 812 sent by the financial advisor, and a check box allowing convenient deletion of the note, if desired, by the user. The home page also includes contentlet 810, which provides information about the financial advisor of the user, including a hyperlink allowing the user top conveniently e-mail the financial advisor.

Figure 9:
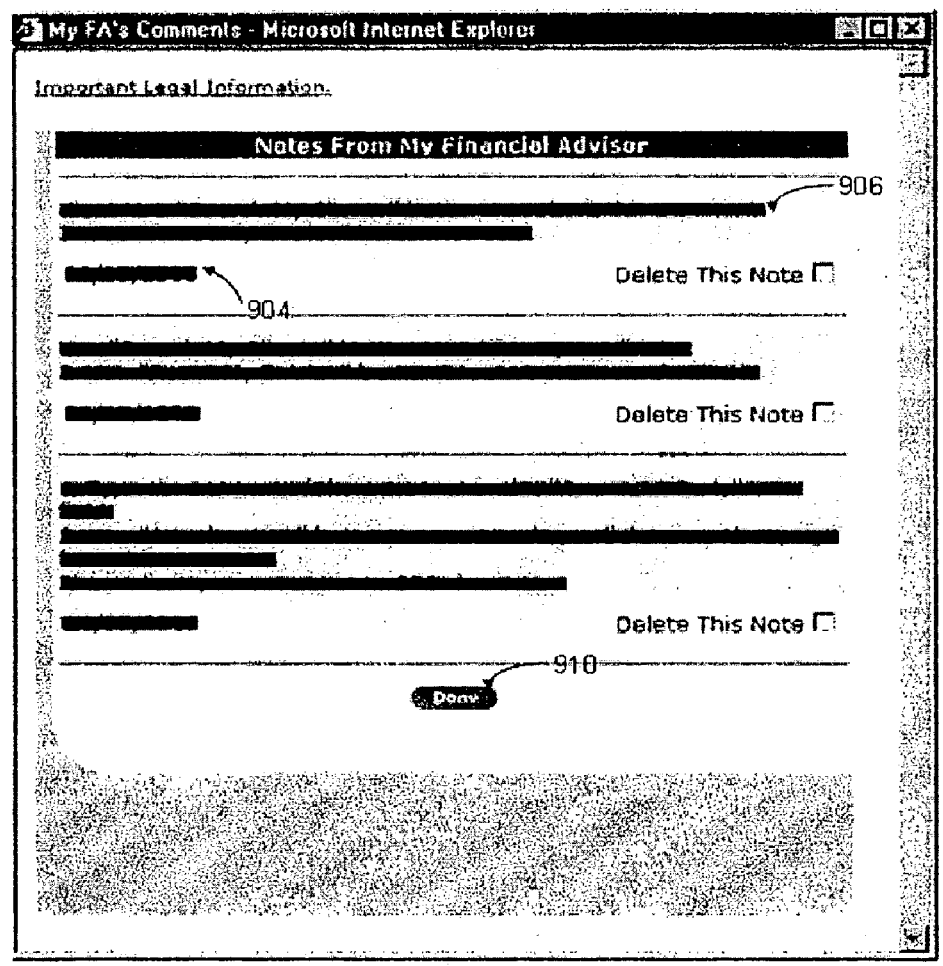
FIG. 9 depicts a graphical user interface according to one embodiment of the invention, in which financial advisor notes are presented to a client.

FIG. 9 depicts a graphical user interface 900 according to one embodiment of the invention, in which several financial advisor notes 902 are presented to a client. For example, the graphical user interface 900 can be window that appears when the user to whom a financial advisor has sent several notes, selects the "You have a note from your financial advisor" hyperlink 804, as depicted in FIG. 8. The indicated text 904 can be, for example, the date and time that the note was sent by the financial advisor. The user can select "done" button 910 to cause the window to disappear.

FIGS. 10-14 depict a series of graphical user interfaces which can comprise an integrated group of applications provided to a financial advisor through a computer system of a financial services organization with which the financial advisor is associated.

Figure 10:
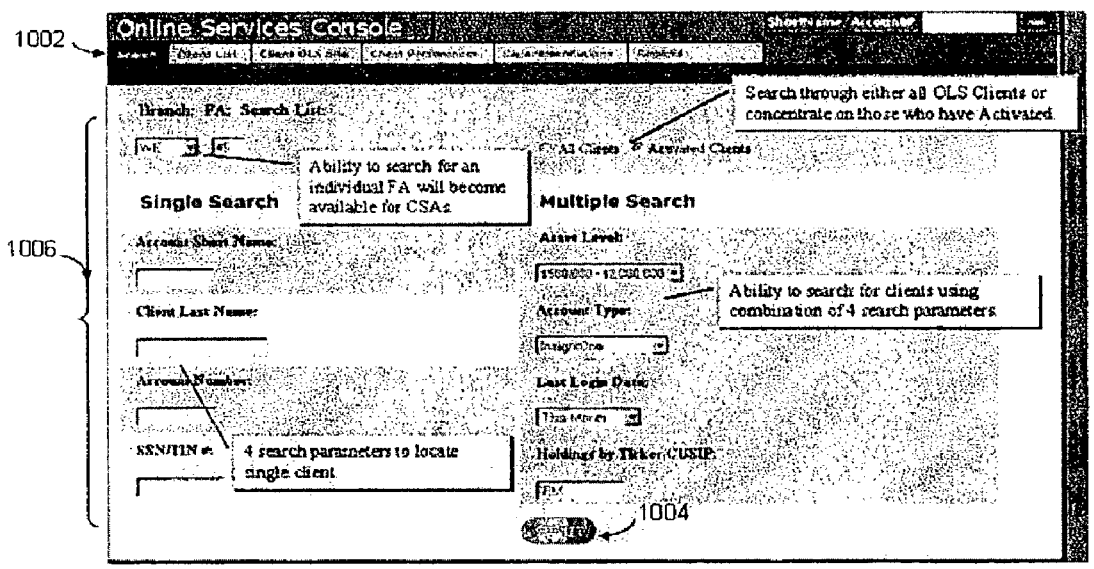
FIG. 10 depicts a graphical user interface according to one embodiment of the invention, allowing client searching.

FIG. 10 depicts a graphical user interface 1000 according to one embodiment of the invention, allowing client searching by a financial advisor. Client search tools can allow searching through data associated with clients and pertaining to their accounts or other characteristics can allow financial advisors to accurately and efficiently find or otherwise determine an appropriate set of clients to receive a particular message. The financial advisor can use the search tool interface 1006 to cause a search engine to determine a set of clients of the financial advisor that match the criteria that the financial advisor indicates. The financial advisor selects "Submit" button 1004 to cause the specified query to be performed. A tool bar 1002 is provided to provide one way to allow the financial advisor to navigate between different graphical user interfaces and applications, including the depicted graphical user interface 1000, entitled "Search."

FIG. 11 depicts a graphical user interface 1100, entitled "Client List" in the toolbar 1002, according to one embodiment of the invention, allowing client selection from search results, such as the results of a query performed and submitted using the graphical user interface 1000 depicted in FIG. 10. Area 1104 provides a list of clients returned from the query, check boxes to allow the financial advisor to manually select individual clients, and information associated with each client, including account information and recent log in history.

FIG. 12 depicts a graphical user interface 1200 according to one embodiment of the invention, entitled "FA Notes" in the toolbar 1002, allowing client selection from client search results in area 1204, and message determination and sending in area 1206. The area 1206 allows a financial advisor to compose a message, including subject and body, as well as, using buttons 1208 and 1210, to include file attachments or links in the message, and message preview, spell check, and other functions are available using buttons 1212.

FIG. 13 depicts a graphical user interface 1300 according to one embodiment of the invention, allowing confirmation of sending of a message determined by a financial advisor. As depicted, area 1304 provides a list of selected clients to receive the message, a preview of the message itself in area 1306, and buttons 1308 allow the financial advisor to decide to send or cancel the message.

FIG. 14 depicts a graphical user interface 1400 according to one embodiment of the invention, providing a list of messages sent by a financial advisor. Table 1402 lists information about recently sent messages, and selecting a note will cause the note to be displayed.

FIGS. 15-18 depict a series of graphical user interfaces that comprise a financial advisor messaging application provided to a financial advisor by a financial services organization with which the financial advisor is associated.

Figure 15:
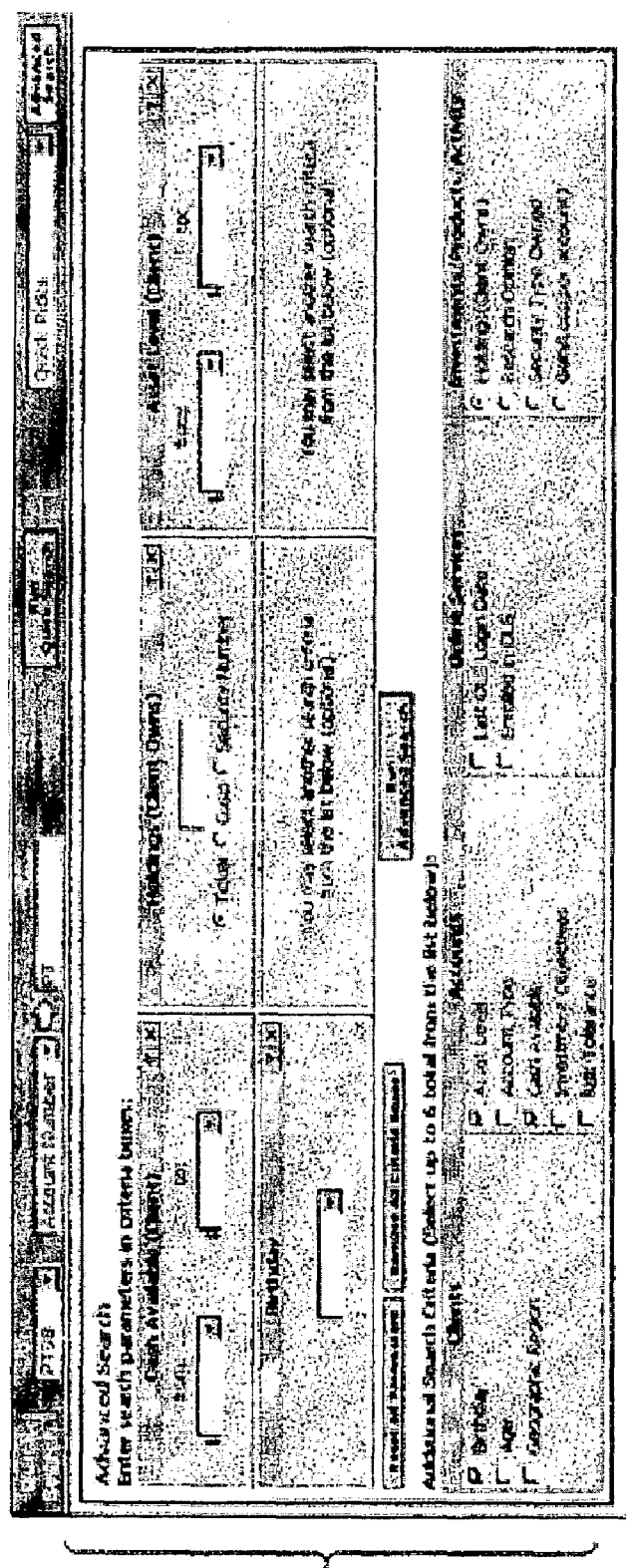
FIG. 15 depicts a graphical user interface according to one embodiment of the invention, allowing client searching.

FIG. 15 depicts a graphical user interface 1500 according to one embodiment of the invention, allowing client searching. Area 1502 allows complex searching for clients based on various criteria associated with the clients or their accounts with the financial services organization. The information can reside, for example, in a database maintained in a host system of the financial services organization, such as the client database 130 depicted in FIGS. 1 and 2.

Figure 16:
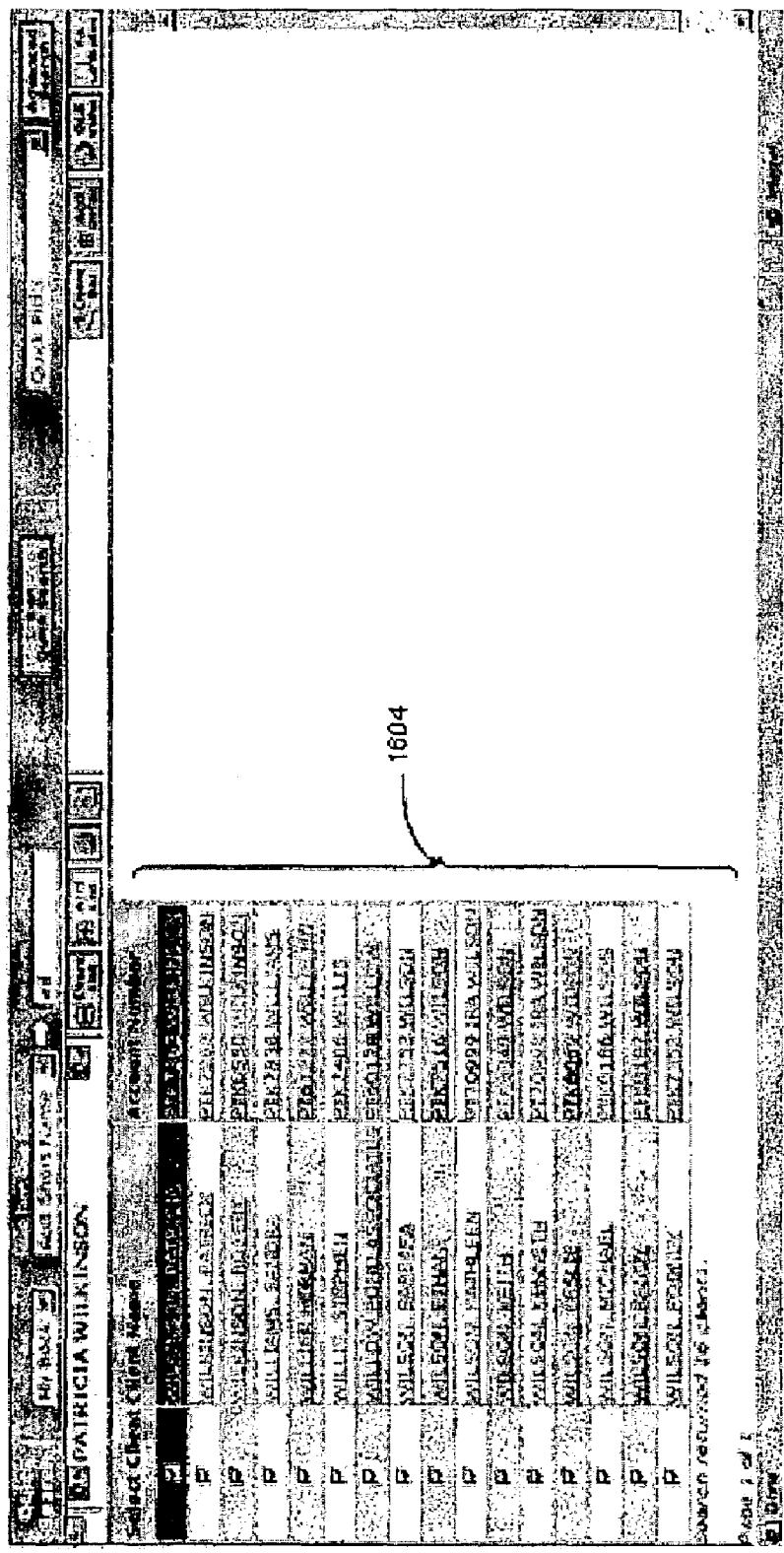
FIG. 16 depicts a graphical user interface according to one embodiment of the invention, allowing client selection from search results.

FIG. 16 depicts a graphical user interface 1600 according to one embodiment of the invention, allowing client selection from search results such as a search conducted using graphical user interface 1500 depicted in FIG. 15. Area 1604 provides a table of clients resulting from a search, and lists their names and account numbers.

Figure 17:
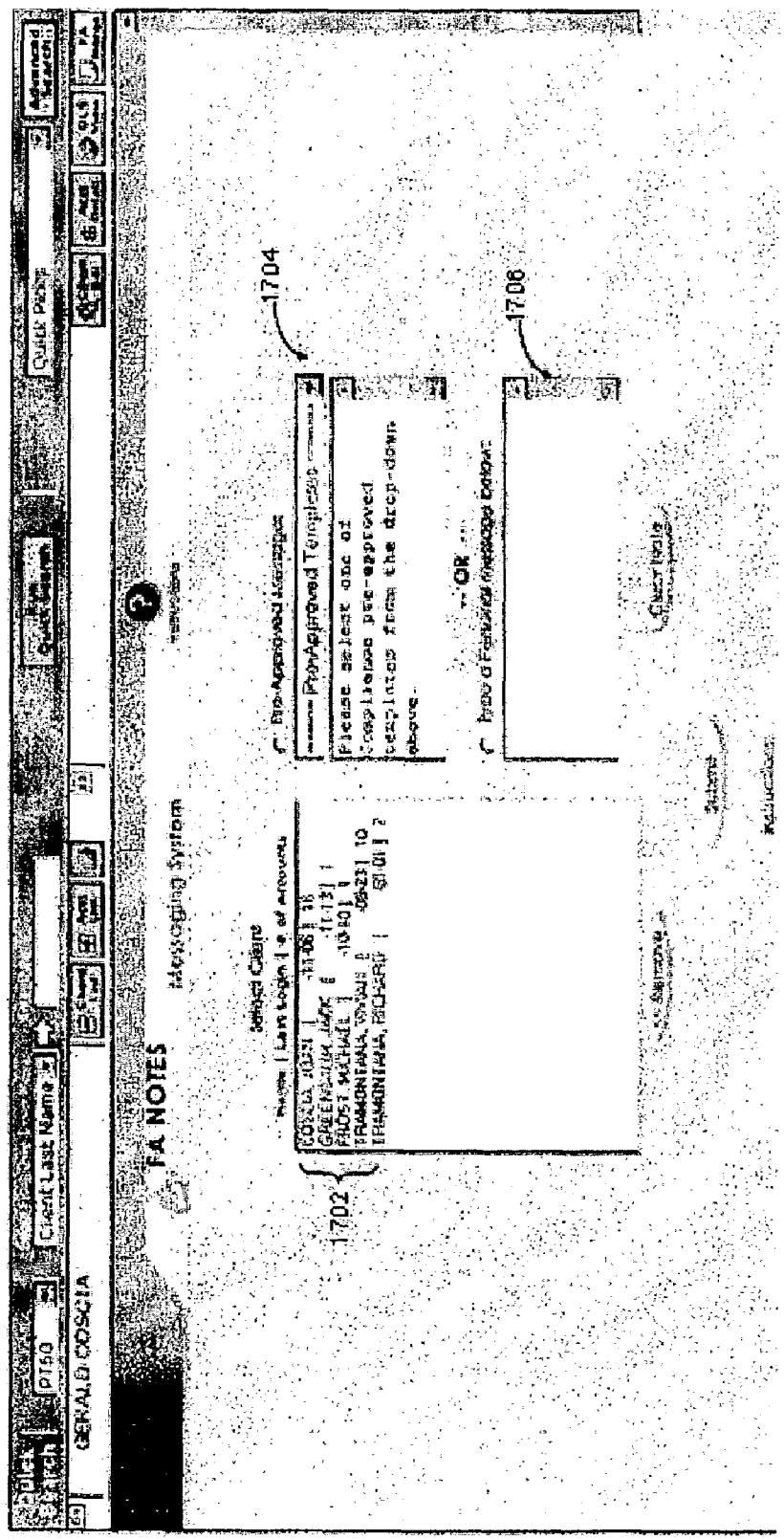
FIG. 17 depicts a graphical user interface according to one embodiment of the invention, allowing client selection, message selection and message composition.

FIG. 17 depicts a graphical user interface 1700 according to one embodiment of the invention, allowing client selection, message selection and message composition, via areas 1702, 1704, and 1706, respectively.

Figure 18:
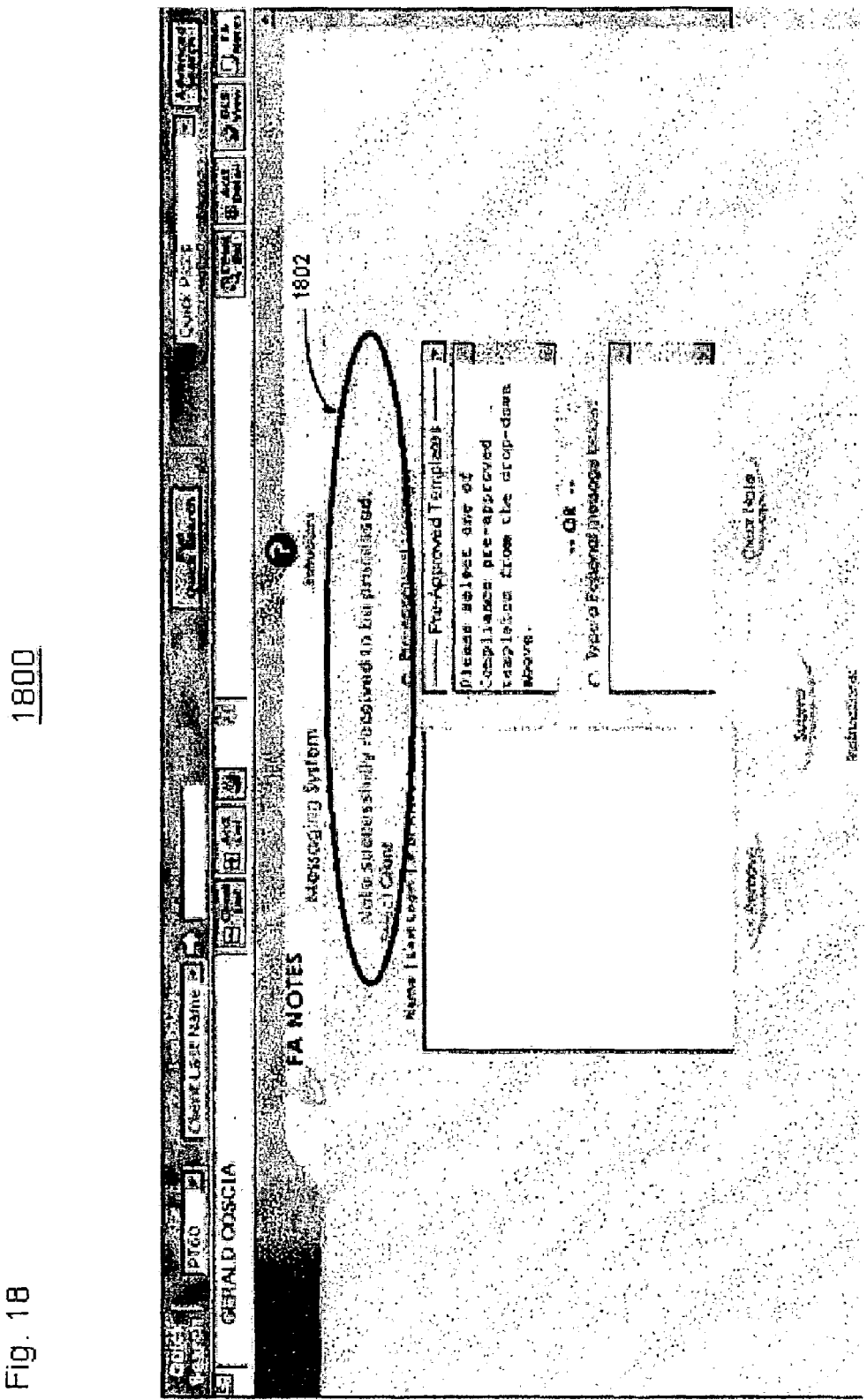
FIG. 18 depicts a graphical user interface according to one embodiment of the invention, in which a financial advisor is electronically notified of a message received to be processed.

FIG. 18 depicts a graphical user interface 1800 according to one embodiment of the invention, in which a financial advisor is electronically notified, via message 1802, of a message received to be processed. The graphical user interface 1800 can result, for example, after a financial advisor successfully sends a message, which can be a pre-approved message or a composed message that was approved, or determined to be compliant, prior to sending.

Figure 19:
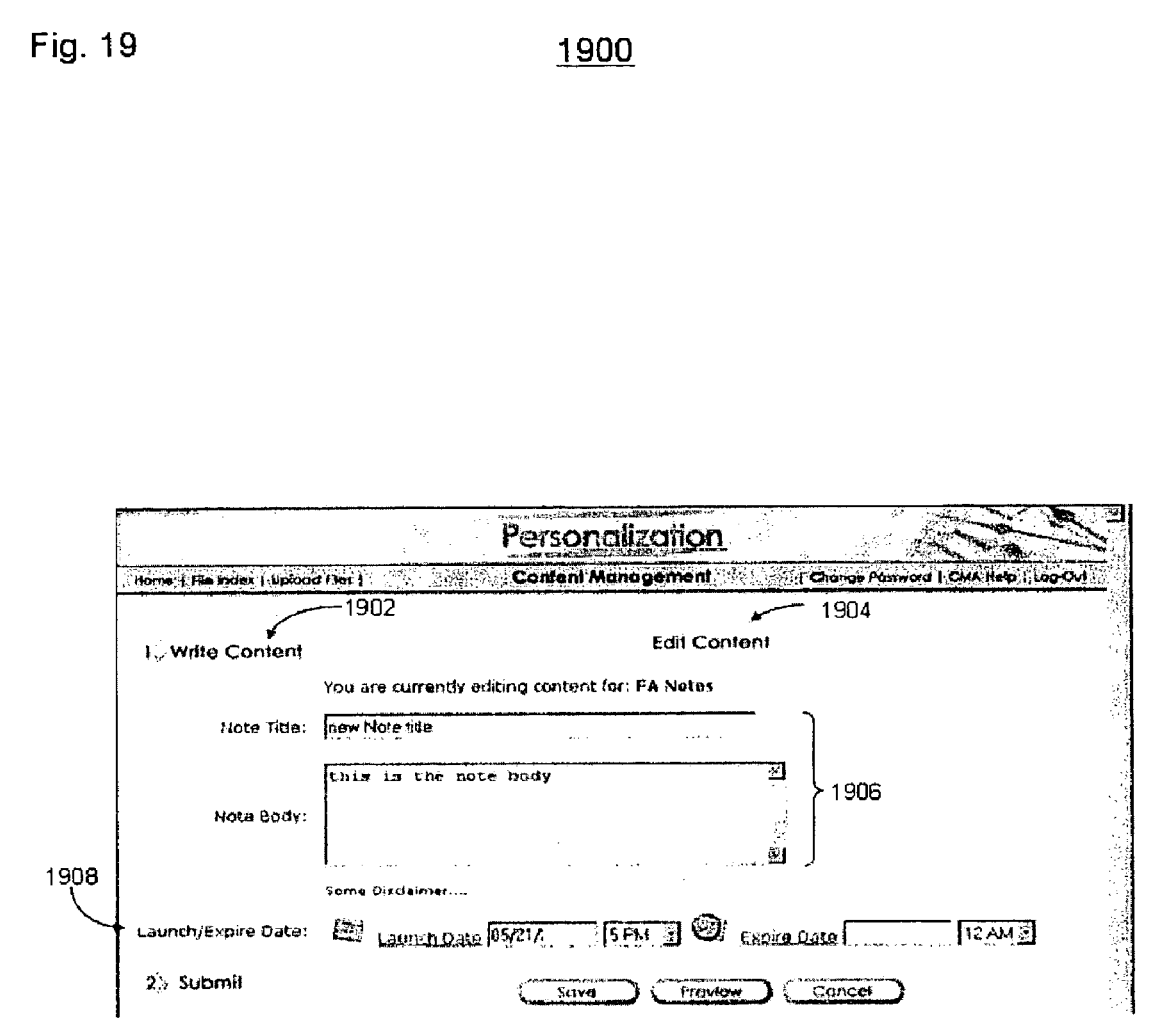

FIGS. 19-20 depict graphical user interfaces that relate to administration of a message database, such as message database 128 depicted in FIGS. 1 and 2, and publication of messages. A message is considered published when it is made available for selection by financial advisors as a pre-approved message. Is some embodiments, the graphical user interfaces and functionality of the graphical user interfaces depicted in FIGS. 19-20 are only available to administrative personnel associated with the relevant financial services organization, with special clearance to perform such functions, which can be enforced, for example, by limiting electronic access to various functions, applications or Web pages, through the use of passwords or other means.

FIG. 19 depicts a graphical user interface 1900 according to one embodiment of the invention, in which a message is created for publication. Areas 1902 and 1904 allow a user to choose between writing or editing new content to be included in one or more notes. Area 1906 allows writing of new content. Area 1908 allows the user to set a launch, or initial publication, date and time, as well as an expire date and time, when the note will no longer be published, or available for selection by financial advisors.

FIG. 20 depicts a graphical user interface 2000 according to one embodiment of the invention, providing a list of published messages. Area 2006 lists notes created by the user, or by all users, as well as information about each note. The information includes a status of each note, such as "live," meaning currently published.

Figure 21:
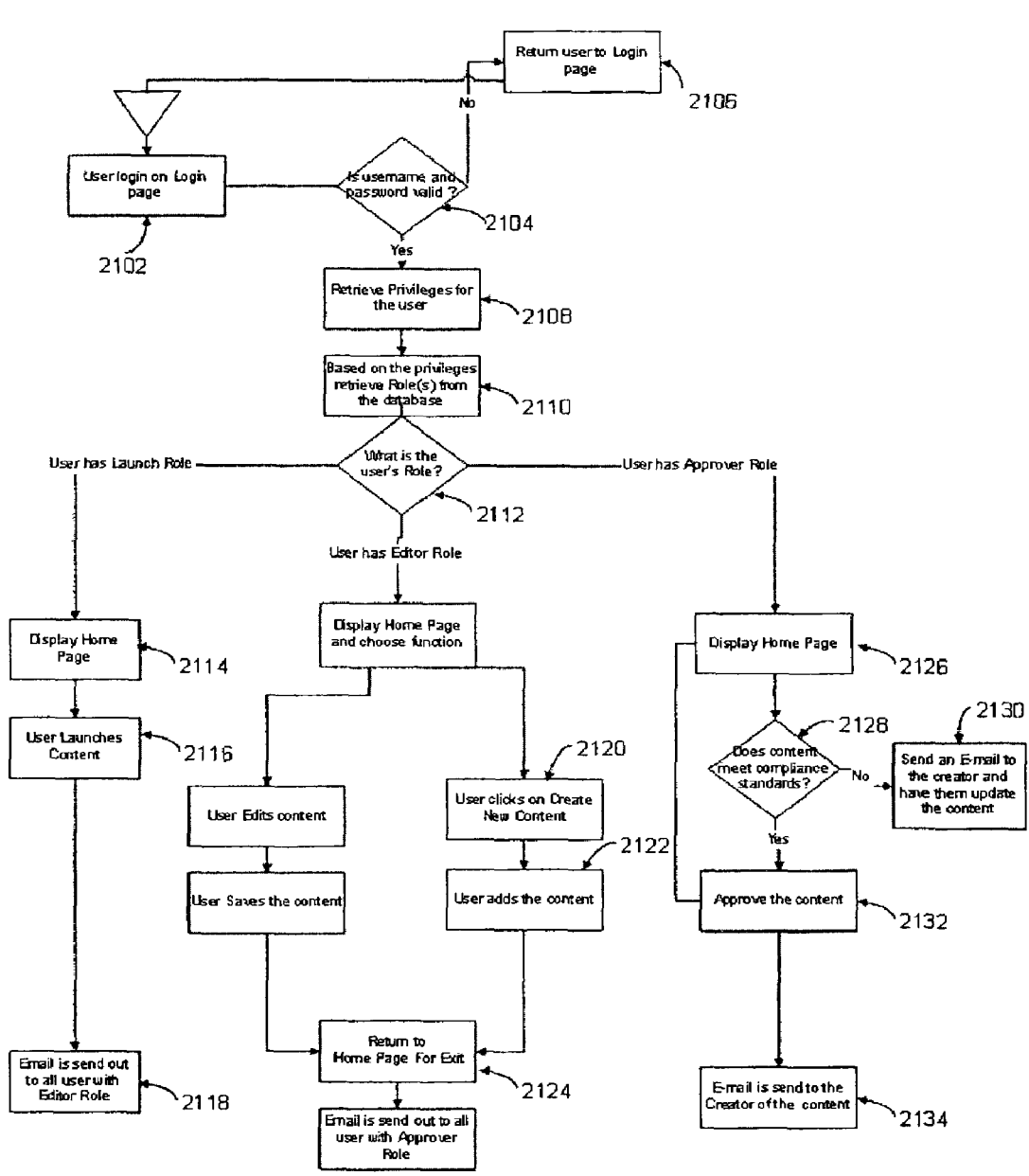
FIG. 21 is a flow diagram depicting a method 2100 message administration and management according to one embodiment of the invention.

FIG. 21 is a flow diagram depicting a method 2100 of message administration and management according to one embodiment of the invention. At step 2102, a user attempts to login to be able to perform message administration and management functions. At step 2104, a system, such as the host system 118 depicted in FIG. 1, check the user's username and password for validity. If the username and password are invalid, the method 2100 proceeds to step 2106, which returns the user to the login page at step 2102. If the username and password are valid, the method 2100 proceeds to step 2108, at which the system retrieves from a database the message administration and management privileges of the user. At step 2110, the system retrieves from a database a role of the user with respect to message administration and management. At step 2112, the system queries the role of the user. If the user has a launch role, the method 2100 proceeds to steps 2114 through 2118. At step 2114 the system displays a home page associated with the launch role. At step 2116 the user uses the system to launch content, or publish notes. At step 2118, an e-mail message is sent to individuals or groups with an editor role, who may edit published notes.

If the user has an editor role, the method 2100 proceeds to step 2114, at which the system displays a home page associated with the editor role and allows the user to choose an edit function. If the user chooses an edit existing content function, at steps 2116 and 2118, respectively, the user edits published content or notes, and saves the edited content to a database, such as the message database 128 depicted in FIGS. 1 and 2. If the user chooses a create new content function, at steps 2120 and 2122, respectively, the user creates new content and adds the content to be saved in the database. At the conclusion of step 2118 or 2122, the user is again presented with the editor role home page. Upon exit from the home page, an e-mail is sent out to all users, including individuals or groups, that have an approver role, or compliance determination role.

If the user has an approver role, the method 2100 proceeds to step 2126, at which the system displays a home page associated with the approver role. At step 2128, the approver user queries whether content meets compliance standards. If content being considered by the approver user is determined by the approver user to not meet compliance standards, such as standards set by the financial services organization, then, at step 2130 an e-mail is sent to the creator of the content to provide the creator with an opportunity to revise the content and cause it to be in conformance with compliance standards. If content being considered by the approver user is determined by the approver user to meet compliance standards, at step 2132, the approver user approves the content. Following step 2132, at step 2134, an e-mail is sent out to the creator of the content to inform the creator that the content has been approved.

It is to be understood that compliance and publishing procedures can vary according to the standards and procedures as determined by a particular financial services organization. For example, in some embodiments, compliance can involve a complex workflow for approval by various departments of the organization, including, for instance, a legal department, a sales department, a marketing department, and potentially others, all or some of which must approve a message for the message to be considered compliant by the financial services organization.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of managing client communications in an organization, comprising:

presenting a first user interface at a first user terminal through which a first user of the organization having editor privileges creates or edits content;

receiving the content created or edited through the first user interface from the first user terminal, storing the content in a message database and automatically transmitting an electronic notification message to a second user of the organization having approval privileges informing the second user of the stored content;

presenting a second user interface comprising the stored content through a second user terminal to the second user;

receiving an entry through the second user interface from the second user terminal indicating an approval status of the stored content;

presenting a third user interface at a third user terminal through which a third user of the organization authorized to send messages to clients selects the body of a message for transmission to one or more clients from approved content published for user selection; and transmitting the message over a network for access by the one or more clients.

2. The method of claim 1, further comprising:

presenting the third user interface with a client search tool through which the third user selects the one or more clients to receive the message.

3. The method of claim 1, further comprising automatically transmitting the electronic notification message to a compliance group of the financial services organization of which the second user is a member to approve the body of the message.

4. The method of claim 3, further comprising transmitting the message to two or more subgroups of the compliance group to approve the body of the message by each of the subgroups.

5. The method of claim 4, comprising providing at least one of the subgroups with an opportunity to edit the body of the message prior to approval.

6. The method of claim 1, further comprising providing an electronic notification of the transmission of the message to the one or more clients.

7. The method of claim 6, further comprising providing the electronic notification in association with a financial services related contentlet of a graphical user interface associated with a financial account, the contentlet being one of a plurality of financial services related contentlets of the graphical user interface, and the graphical user interface providing integrated financial services applications availability to a user.

8. The method of claim 1, further comprising automatically determining whether the body of the message is compliant with the requirements, procedures or practices established by the organization.

9. A system of managing client communications in an organization, comprising:

at least one server computer presenting a first user interface at a first user terminal through which a first user of the organization having editor privileges creates or edits content;

the server computer receiving the content created or edited through the first user interface from the first user terminal, storing the content in a message database and automatically transmitting an electronic notification message to a second user of the organization having approval privileges informing the second user of the stored content;

the server computer presenting a second user interface comprising the stored content through a second user terminal to the second user;

the server computer receiving an entry through the second user interface from the second user terminal indicating an approval status of the stored content;

the server computer presenting a third user interface at a third user terminal through which a third user of the organization authorized to send messages to clients selects the body of a message for transmission to one or more clients from approved content published for user selection; and the server computer transmitting the message over a network for access by the one or more clients.

10. The system of claim 9, wherein the network comprises the Internet.

11. The system of claim 9, wherein the at least one server computer presents the third user interface with a client search tool through which the third user selects the one or more clients to receive the message.

12. The system of claim 9, wherein the at least one server computer automatically transmits the electronic notification message to a compliance group of the organization of which the second user is a member to approve the body of the message.

13. The system of claim 12, wherein the at least one server computer transmits the message to two or more subgroups of the compliance group to approve the body of the message by each of the subgroups.

14. The system of claim 13, wherein at least one of the subgroups is provided with an opportunity to edit the body of the message prior to approval.

15. The system of claim 9, wherein the at least one server computer provides an electronic notification of the transmission of the message to the one or more clients.

16. The system of claim 15, wherein the at least one server computer provides the electronic notification in association with a financial services related contentlet of a graphical user interface associated with a financial account, the contentlet being one of a plurality of financial services related contentlets of the graphical user interface, and the graphical user interface providing integrated financial services applications availability to a user.

17. The system of claim 9, wherein the at least one server computer automatically determines whether the body of the message is compliant with the requirements, procedures or practices established by the organization.

18. Computer usable media storing program code which, when executed on one or more computerized devices, causes the computerized devices to execute a method for managing client communications in an organization, comprising:

presenting a first user interface at a first user terminal through which a first user of the organization having editor privileges creates or edits content;

receiving the content created or edited through the first user interface from the first user terminal, storing the content in a message database and automatically transmitting an electronic notification message to a second user of the organization having approval privileges informing the second user of the stored content;

presenting a second user interface comprising the stored content through a second user terminal to the second user;

receiving an entry through the second user interface from the second user terminal indicating an approval status of the stored content;

presenting a third user interface at a third user terminal through which a third user of the organization authorized to send messages to clients selects the body of a message for transmission to one or more clients from approved content published for user selection; and transmitting the message over a network for access by the one or more clients.

19. A method of managing client communications in an organization, comprising:

presenting a first user interface at a first user terminal through which a first user of the organization composes the body of a message for transmission to one or more clients;

receiving the message through the first user interface from the first user terminal and automatically transmitting the message to a second user of the organization having approval privileges;

presenting a second user interface comprising the body of the message through a second user terminal to the second user;

receiving an entry through the second user interface indicating an approval status of the body of the message from the second user terminal; and automatically transmitting the message over a network for access by the one or more clients.

20. The method of claim 19, wherein the body of the message is disapproved, the method further comprising transmitting a second message to a user terminal of a manager of the first user indicating that the body of the message is disapproved.

21. The method of claim 20, further comprising transmitting the message for access by the one or more clients prior to transmitting the second message to the manager.

22. The method of claim 20, wherein transmitting the second message comprises transmitting the second message including at least a disapproved portion of the message transmitted for access by the one or more clients.

23. A system of managing client communications in an organization, comprising:

at least one server computer presenting a first user interface at a first user terminal through which a first user of the organization composes the body of a message for transmission to one or more clients;

the server computer receiving the message through the first user interface from the first user terminal and automatically transmitting the message to a second user of the organization having approval privileges;

the server computer presenting a second user interface comprising the body of the message through a second user terminal to the second user;

the server computer receiving an entry through the second user interface indicating an approval status of the body of the message from the second user terminal; and the server computer automatically transmitting the message over a network for access by the one or more clients.

24. Computer usable media storing program code which, when executed on one or more computerized devices, causes the computerized devices to execute a method for managing client communications in an organization, comprising:

presenting a first user interface at a first user terminal through which a first user of the organization composes the body of a message for transmission to one or more clients;

receiving the message through the first user interface from the first user terminal and automatically transmitting the message to a second user of the organization having approval privileges;

presenting a second user interface comprising the body of the message through a second user terminal to the second user;

receiving an entry through the second user interface indicating an approval status of the body of the message from the second user terminal; and automatically transmitting the message over a network for access by the one or more clients.

* * * * *

UNITED STATES PATENT AND TRADEMARK OFFICE
CERTIFICATE OF CORRECTION

PATENT NO. : 7,590,579 B2  Page 1 of 1
APPLICATION NO. : 10/365323
DATED : September 15, 2009
INVENTOR(S) : Data et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1603 days.

Signed and Sealed this

Twenty-first Day of September, 2010

David J. Kappos
*Director of the United States Patent and Trademark Office*